United States Patent
Perner et al.

(10) Patent No.: US 12,201,858 B2
(45) Date of Patent: Jan. 21, 2025

(54) FALL PROTECTION EQUIPMENT CONNECTION STATUS AND CONTROL

(71) Applicant: 3M INNOVATIVE PROPERTIES COMPANY, St. Paul, MN (US)

(72) Inventors: Judd J. Perner, East Dubuque, IL (US); Ronald D. Jesme, Plymouth, MN (US); Travis W. Rasmussen, Rosemount, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 1514 days.

(21) Appl. No.: 16/495,330

(22) PCT Filed: Mar. 9, 2018

(86) PCT No.: PCT/IB2018/051571
§ 371 (c)(1),
(2) Date: Sep. 18, 2019

(87) PCT Pub. No.: WO2018/178780
PCT Pub. Date: Oct. 4, 2018

(65) Prior Publication Data
US 2020/0016439 A1    Jan. 16, 2020

Related U.S. Application Data

(60) Provisional application No. 62/479,793, filed on Mar. 31, 2017.

(51) Int. Cl.
*A62B 35/00* (2006.01)
*F16B 45/02* (2006.01)
*G08B 21/02* (2006.01)

(52) U.S. Cl.
CPC ...... *A62B 35/0025* (2013.01); *A62B 35/0037* (2013.01); *A62B 35/0081* (2013.01);
(Continued)

(58) Field of Classification Search
CPC .... A62B 35/0025; F16B 45/023; G08B 21/02
See application file for complete search history.

(56) References Cited

U.S. PATENT DOCUMENTS 4,392,214 A * 7/1983 Marini ................. G21C 17/017
376/245
5,593,113 A * 1/1997 Cox ......................... B64D 1/22
294/82.26
(Continued)

FOREIGN PATENT DOCUMENTS

CN    103801039 A  *  5/2014
CN    205007466 U  *  2/2016
(Continued)

OTHER PUBLICATIONS

Search Report for TW Patent Appl. No. 107111126315.2, mailed on Jun. 24, 2021, 1 pp.
(Continued)

*Primary Examiner* — Brian D Mattei
*Assistant Examiner* — Kathleen M. McFarland
(74) *Attorney, Agent, or Firm* — Kenneth B. Wood; Johannes P. M. Kusters

(57) ABSTRACT

Techniques are described for monitoring and controlling fall protection equipment. For example, the techniques of this disclosure may be used to monitor the connection status of fall protection equipment, e.g., whether or not the fall protection equipment is connected to a support structure. The techniques of this disclosure may also be used to control the operation of the fall protection equipment based on the connection status.

15 Claims, 8 Drawing Sheets

(52) U.S. Cl.
CPC .......... *F16B 45/023* (2021.05); *F16B 45/028* (2021.05); *G08B 21/02* (2013.01)

(56) References Cited

U.S. PATENT DOCUMENTS

| | | | | |
|---|---|---|---|---|
| 7,106,205 | B2* | 9/2006 | Graef | A62B 35/0012 340/687 |
| 8,294,580 | B2* | 10/2012 | Witwer | G08B 21/02 340/568.1 |
| 8,325,053 | B2* | 12/2012 | Flynt | A62B 35/0025 182/4 |
| 8,482,401 | B2* | 7/2013 | Morino | A62B 35/0025 340/532 |
| 8,675,823 | B2* | 3/2014 | Hooten | A62B 35/04 379/37 |
| 8,754,768 | B2* | 6/2014 | Prieto | G06Q 10/10 340/539.23 |
| 9,168,402 | B2* | 10/2015 | Casebolt | A62B 1/14 |
| 9,421,402 | B2* | 8/2016 | Blaise | A62B 35/0068 |
| 9,480,866 | B2* | 11/2016 | Pollard | A62B 35/0075 |
| 9,511,245 | B2* | 12/2016 | Moore, Jr. | A62B 35/0025 |
| 9,665,999 | B2* | 5/2017 | Farioli Brioschi | G06Q 30/018 |
| 9,704,370 | B2* | 7/2017 | Ulner | A62B 35/0075 |
| 9,747,760 | B2* | 8/2017 | Fletcher | H04B 17/318 |
| 10,092,784 | B2* | 10/2018 | Dehondt | A62B 35/0087 |
| 10,138,102 | B2* | 11/2018 | Baillargeon | B66F 17/006 |
| 10,232,198 | B2* | 3/2019 | Cuny | G08B 21/0446 |
| 10,328,294 | B2* | 6/2019 | Hetrich | A62B 35/0075 |
| 2005/0092546 | A1* | 5/2005 | Hsu | A62B 35/04 182/6 |
| 2005/0133303 | A1* | 6/2005 | Hsu | A62B 35/04 340/687 |
| 2010/0231402 | A1* | 9/2010 | Flynt | G08B 19/00 340/679 |
| 2011/0001602 | A1* | 1/2011 | Farioli Brioschi | H04B 5/0062 340/3.1 |
| 2011/0006894 | A1* | 1/2011 | Witwer | G08B 21/02 340/539.11 |
| 2011/0090079 | A1* | 4/2011 | Morino | A62B 35/0075 340/532 |
| 2011/0103558 | A1* | 5/2011 | Hooten | A62B 35/04 379/37 |
| 2012/0217091 | A1* | 8/2012 | Baillargeon | G08B 21/02 182/18 |
| 2013/0213735 | A1* | 8/2013 | Dehondt | A62B 35/0087 24/600.1 |
| 2013/0335221 | A1* | 12/2013 | Prieto | G08B 21/02 340/540 |
| 2014/0150502 | A1* | 6/2014 | Duncan | E05B 47/0004 70/20 |
| 2014/0266693 | A1* | 9/2014 | Moulton | G08B 21/043 340/539.12 |
| 2015/0014092 | A1* | 1/2015 | Blaise | A62B 35/0081 182/5 |
| 2015/0027808 | A1* | 1/2015 | Baillargeon | A62B 35/0025 182/19 |
| 2015/0265860 | A1* | 9/2015 | Kennedy | A62B 35/0075 182/3 |
| 2015/0276521 | A1* | 10/2015 | Moore, Jr. | A62B 35/00 702/41 |
| 2016/0027279 | A1* | 1/2016 | Ulner | G08B 25/016 340/573.1 |
| 2016/0046305 | A1* | 2/2016 | Cylvick | B61L 21/10 701/19 |
| 2016/0107007 | A1* | 4/2016 | Pollard | A62B 35/0075 182/3 |
| 2016/0232758 | A1* | 8/2016 | Fletcher | G08B 21/0247 |
| 2017/0103632 | A1* | 4/2017 | Tolle | H04W 12/06 |
| 2017/0193799 | A1* | 7/2017 | Holub | A62B 35/0075 |
| 2017/0291049 | A1* | 10/2017 | Hetrich | A62B 35/0075 |
| 2018/0117373 | A1* | 5/2018 | Cuny | G08B 25/016 |
| 2019/0269949 | A1* | 9/2019 | Kennedy | F16B 45/023 |
| 2020/0016439 | A1* | 1/2020 | Perner | F16B 45/023 |

FOREIGN PATENT DOCUMENTS

| | | |
|---|---|---|
| JP | 60198167 | 10/1985 |
| JP | 2009142425 A * | 7/2009 |
| JP | 20091424252 | 7/2009 |
| JP | 2015213570 A * | 12/2015 |
| JP | 20152135702 | 12/2015 |
| TW | 201603859 A | 2/2016 |

OTHER PUBLICATIONS

International Search Report for PCT International Application No. PCT/IB2018/051571, mailed on Sep. 19, 2018, 3 pages.
Search Report for CN Patent Appl. No. 201880022315.2, mailed on Aug. 26, 2020, 2 pp.
"Full Body Harness—100 % Tie Off" youtube [retrieved from the internet on Feburayr 29, 2024] URL https://www.youtube.com/watch?v=NwJ4SQ3kAK8.

* cited by examiner

FALL PROTECTION EQUIPMENT CONNECTION STATUS AND CONTROL

TECHNICAL FIELD

This disclosure relates to safety equipment and, in particular, fall protection equipment.

BACKGROUND

Fall protection equipment is important safety equipment for workers operating at potentially harmful or even deadly heights. For example, to help ensure safety in the event of a fall, workers often wear safety harnesses connected to support structures with fall protection equipment such as lanyards, energy absorbers, self-retracting lanyards (SRLs), descenders, and the like. When a worker is connected to a support structure, the worker may be referred to as to being "tied off." In order to maintain a safe working condition when working at height, a worker may maintain at least one connection to a support structure at all times.

Fall protection equipment may include a variety of components for connecting a worker to a support structure (also referred to as an anchorage). For example, snap hooks and carabiners may have movable gates that allow a worker to connect to and disconnect from a support structure. As another example, a ladder safety sleeve may have a movable gate that allows the worker to connect to and disconnect from a climbing ladder fall arrest system carrier e.g., flexible cable or rigid rail support structure.

SUMMARY

In general, this disclosure describes techniques for monitoring and controlling fall protection equipment. For example, the techniques of this disclosure may be used to monitor the connection status of fall protection equipment, e.g., whether or not the fall protection equipment is connected to a support structure. The techniques of this disclosure may also be used to control the operation of the fall protection equipment based on the connection status. For example, aspects of this disclosure relate to determining that a particular article of fall protection equipment is the only fall protection equipment connected to a support structure. Based on the determination, the techniques include initiating an alert and/or preventing the fall protection equipment from being disconnected from the support structure. In this way, the techniques may help to ensure that worker maintains at least one connection to a support structure when working at height.

In one example, a method comprises determining that a first article of fall protection equipment is connected to at least one support structure, the first article of fall protection equipment being included in a set of fall protection equipment that comprises at least one second article of fall protection equipment, determining that the first article of fall protection equipment is the only article of fall protection equipment in the set of fall protection equipment that is connected to the at least one support structure, and performing, based on determining that the first article of fall protection equipment is the only article of fall protection equipment that is connected to the at least one support structure, at least one operation.

In another example, a device comprises a memory configured to store data that indicates whether a first article of fall protection equipment is connected to at least one support structure. The device also comprises one or more processors configured to communicate with the memory and configured to determine, based on the data, that the first article of fall protection equipment is connected to the at least one support structure, the first article of fall protection equipment being included in a set of fall protection equipment that comprises at least one second article of fall protection equipment, determine that the first article of fall protection equipment is the only article of fall protection equipment in the set of fall protection equipment that is connected to the at least one support structure, and perform, based on determining that the first article of fall protection equipment is the only article of fall protection equipment that is connected to the at least one support structure, at least one operation.

In another example, a fall protection device comprising a body that at least partially defines an area of attachment for attachment of the fall protection device to a support structure, a movable gate connected to the body and configured to move between an open position and a closed position, wherein the open position provides access to the area of attachment for attachment of the fall protection device to the support structure and the closed position prevents access to the area of attachment, and a first sensor configured to generate data that indicates whether the support structure is disposed within the area of attachment.

In another example, a system comprises a set of fall protection equipment comprising a first article of fall protection equipment configured to be connected to at least one support structure and at least one second article of fall protection equipment configured to be connected to the at least one support structure. The system also includes a hub comprising a communication unit configured to wirelessly communicate with the first article of fall protection equipment and the at least one second article of fall protection equipment, and one or more processors configured to determine that the first article of fall protection equipment is connected to the at least one support structure, determine that the first article of fall protection equipment is the only article of fall protection equipment in the set of fall protection equipment that is connected to the at least one support structure, and perform, based on determining that the first article of fall protection equipment is the only article of fall protection equipment that is connected to the at least one support structure, at least one operation.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
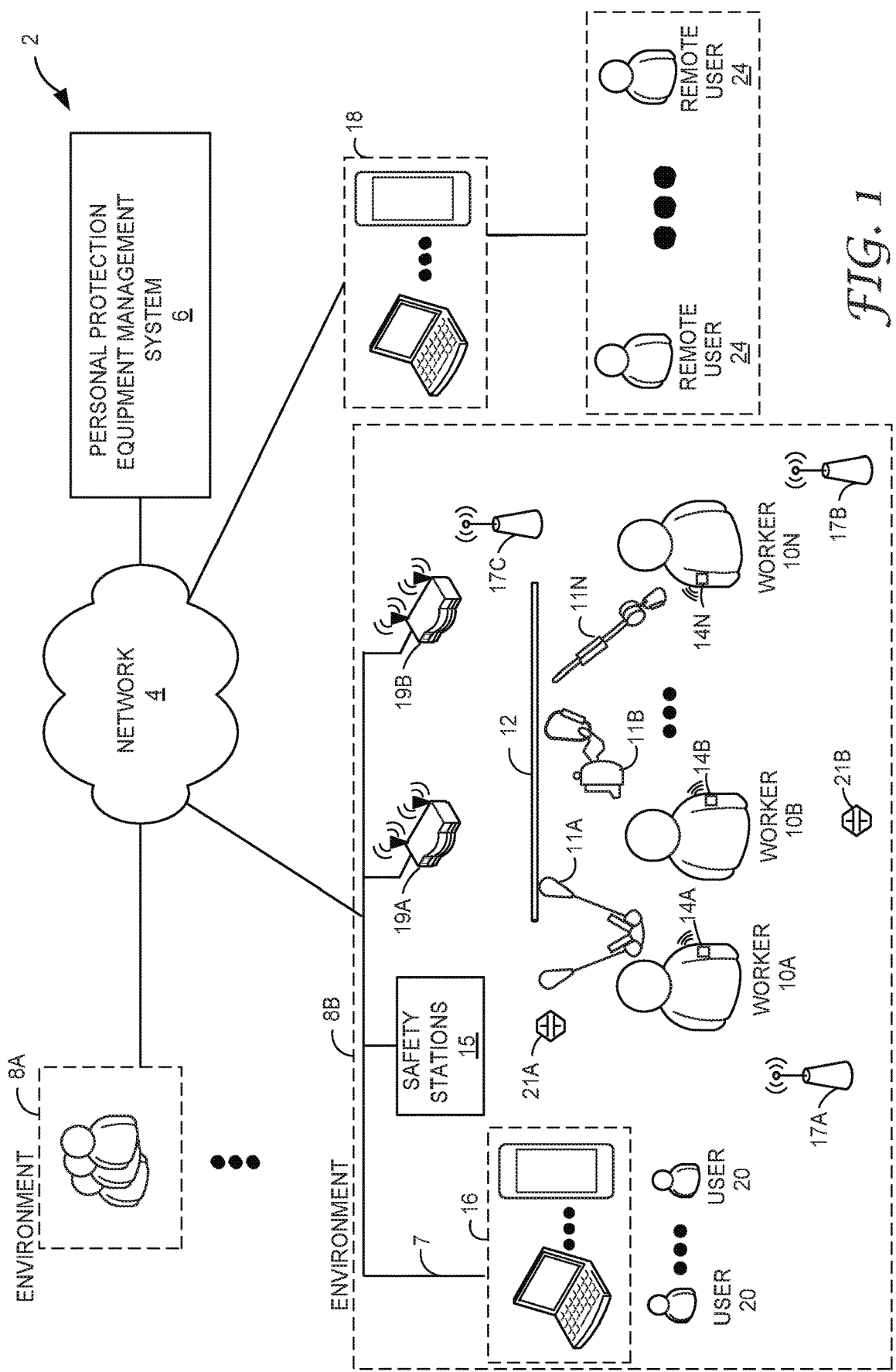
FIG. 1 is a block diagram illustrating an example system in which personal protection equipment (PPEs) having embedded sensors and communication capabilities are utilized within a number of work environments and are managed by a personal protection equipment management system in accordance with various techniques of this disclosure.

According to aspects of this disclosure, an article of fall protection equipment may be configured to incorporate one or more electronic sensors for capturing data that is indicative of the operation of the fall protection equipment. Fall protection equipment may generally refer to a device used to connect a user (e.g., a worker) to a support structure for the purpose of securing the user to the support structure in the event of a fall. Examples of fall protection equipment include a variety of carabiners (also referred to as "spring hooks" or "snap hooks"), shackles, carrier sleeves, or other devices that are capable of connecting a user to and disconnecting a user from the support structure. A particular example of a snap hook that may be adapted to incorporate certain techniques of this disclosure is the Saflok™ Snap Hook manufactured by 3M Fall Protection Business. A particular example of a carrier sleeve may be adapted to incorporate certain techniques of this disclosure is the Lad-Saf™ X3 Detachable Carrier Sleeve manufactured by 3M Fall Protection Business. A support structure may include an anchor, a lifeline, or another structure capable of supporting the weight of a user in the event of a fall.

In some examples, according to aspects of this disclosure, the electronic sensors of the fall protection equipment may be configured to capture data that is indicative of an operation or characteristic of the fall protection equipment. For example, the electronic sensors may capture data that is indicative of a relative position of a component of the fall protection equipment (e.g., a position of a gate of a snap hook, carabiner, or carrier sleeve), data that is indicative of whether a support structure is disposed within an area of attachment for the fall protection equipment, or other operations or characteristics of the fall protection equipment. As described herein, an area of attachment of fall protection equipment may generally refer to an area defined by one or more components of the fall protection equipment that encompass the support structure. That is, when secured to a support structure, the area of attachment is the area of the fall protection equipment in which the support structure is disposed. With respect to a carabiner as an example, the area of attachment may be the interior area of the carabiner defined by a body and a gate of the carabiner.

According to aspects of this disclosure, the fall protection equipment and/or a computing device in communication with the fall protection equipment may use the data from the sensors to determine state changes in a connection status of the fall protection equipment. A connection status generally refers whether the fall protection equipment is connected to a support structure.

In an example for purposes of illustration, an article of fall protection equipment may include a carabiner having a gate that opens and closes to allow the carabiner to be connected to a support structure. According to aspects of this disclosure, in this particular example, electronic sensors may be configured to capture data that is indicative of a relative position of the gate and data that is indicative of whether a support structure is disposed within the carabiner. The carabiner (and/or a computing device in communication with the carabiner) may determine that the carabiner has been connected to a support structure based on data that indicates that the gate has been opened, that a support structure is disposed within the carabiner, and that the gate has been closed.

In some instances, the techniques of this disclosure may also be used to control the operation of the fall protection equipment based on a connection status. For example, in order to maintain a safe working condition when working at height, a worker may maintain at least one connection to a support structure throughout the time that the worker is working at height. Aspects of this disclosure relate to determining that a particular article of fall protection equipment is the only fall protection equipment connected to a support structure. Based on the determination, the techniques include initiating an alert and/or preventing the fall protection equipment from being disconnected from the support structure, e.g., by actuating a lock or other device that helps to prevent the fall protection equipment from being disconnected from the support structure. In this way, the techniques may help to ensure that worker maintains at least one connection to a support structure when working at height.

FIG. 1 is a block diagram illustrating an example computing system 2 that includes a personal protection equipment management system (PPEMS) 6 for managing personal protection equipment. As described herein, PPEMS 6 allows authorized users to perform preventive occupational health and safety actions and manage inspections and maintenance of safety protective equipment. By interacting with PPEMS 6, safety professionals can, for example, manage area inspections, worker inspections, worker health and safety compliance training.

In general, PPEMS 6 provides data acquisition, monitoring, activity logging, reporting, predictive analytics and alert generation. For example, PPEMS 6 includes an underlying analytics and safety event prediction engine and alerting system in accordance with various examples described herein. As further described below, PPEMS 6 provides an integrated suite of personal safety protection equipment management tools and implements various techniques of this disclosure. That is, PPEMS 6 provides an integrated, end-to-end system for managing personal protection equipment, e.g., safety equipment, used by workers 8 within one or more physical environments 10, which may be construction sites, mining or manufacturing sites or any physical environment. The techniques of this disclosure may be realized within various parts of computing environment 2.

As shown in the example of FIG. 1, system 2 represents a computing environment in which a computing device within of a plurality of physical environments 8A, 8B (collectively, environments 8) electronically communicate with PPEMS 6 via one or more computer networks 4. Each of physical environment 8 represents a physical environment, such as a work environment, in which one or more individuals, such as workers 10, utilize personal protection equipment while engaging in tasks or activities within the respective environment.

In this example, environment 8A is shown as generally as having workers 10, while environment 8B is shown in expanded form to provide a more detailed example. In the example of FIG. 1, a plurality of workers 10A-10N are shown as utilizing respective fall protection equipment 11A-11N (collectively, fall protection equipment 11), which are shown in this example as a variety of carabiners, carrier sleeves, and self-retracting lanyards (SRLs), attached to safety support structure 12.

As further described herein, each of fall protection equipment 11 includes embedded sensors or monitoring devices and processing electronics configured to capture data in real-time as a user (e.g., worker) engages in activities while wearing the fall protection equipment. For example, as described in greater detail with respect to the example shown in FIG. 3, fall protection equipment 11 may include a variety of electronic sensors such as one or more sensors configured to sense a characteristic associated with a connection (referred to as connection sensors) and one or more usage and environment sensors for measuring operations of fall to protection equipment 11. In addition, each of fall protection equipment 11 may include one or more output devices for outputting data that is indicative of operation of fall protection equipment 11 and/or generating and outputting communications to the respective worker 10. For example, fall protection equipment 11 may include one or more devices to generate audible feedback (e.g., one or more speakers), visual feedback (e.g., one or more displays, light emitting diodes (LEDs) or the like), or tactile feedback (e.g., a device that vibrates or provides other haptic feedback).

In general, each of environments 8 include computing facilities (e.g., a local area network) by which fall protection equipment 11 is able to communicate with PPEMS 6. For examples, environments 8 may be configured with wireless technology, such as 802.11 wireless networks, 802.15 ZigBee networks, and the like. In the example of FIG. 1, environment 8B includes a local network 7 that provides a packet-based transport medium for communicating with PPEMS 6 via network 4. In addition, environment 8B includes a plurality of wireless access points 19A, 19B that may be geographically distributed throughout the environment to provide support for wireless communications throughout the work environment.

Each of fall protection equipment 11 is configured to communicate data, such as sensed motions, events and conditions, via wireless communications, such as via 802.11 WiFi protocols, Bluetooth protocol or the like. Fall protection equipment 11 may, for example, communicate directly with a wireless access point 19. As another example, each worker 10 may be equipped with a respective one of wearable communication hubs 14A-14N that enable and facilitate communication between fall protection equipment 11 and PPEMS 6. For examples, fall protection equipment 11 as well as other PPEs for the respective worker 10 may communicate with a respective communication hub 14 via Bluetooth or other short range protocol, and the communication hubs may communicate with PPEMs 6 via wireless communications processed by wireless access points 19. Although shown as wearable devices, hubs 14 may be implemented as stand-alone devices deployed within environment 8B.

In some instances, each of hubs 14 may operate as a wireless device for fall protection equipment 11 relaying communications to and from fall protection equipment 11, and may be capable of buffering usage data in case communication is lost with PPEMS 6. Moreover, each of hubs 14 is programmable via PPEMS 6 so that local alert rules may be installed and executed without requiring a connection to the cloud. As such, each of hubs 14 provides a relay of streams of usage data from fall protection equipment 11 and/or other PPEs within the respective environment, and provides a local computing environment for localized alerting based on streams of events in the event communication with PPEMS 6 is lost.

As shown in the example of FIG. 1, an environment, such as environment 8B, may also one or more wireless-enabled beacons, such as beacons 17A-17C, that provide accurate location information within the work environment. For example, beacons 17A-17C may be GPS-enabled such that a controller within the respective beacon may be able to precisely determine the position of the respective beacon. Based on wireless communications with one or more of beacons 17, a given article of fall protection equipment 11 or communication hub 14 worn by a worker 10 is configured to determine the location of the worker within work environment 8B. In this way, event data reported to PPEMS 6 may be stamped with positional information to aid analysis, reporting and analytics performed by the PPEMS.

In addition, an environment, such as environment 8B, may also one or more wireless-enabled sensing stations, such as sensing stations 21A, 21B. Each sensing station 21 includes one or more sensors and a controller configured to output data indicative of sensed environmental conditions. Moreover, sensing stations 21 may be positioned within respective geographic regions of environment 8B or otherwise interact with beacons 17 to determine respective positions and include such positional information when reporting environmental data to PPEMS 6.

As such, PPEMS 6 may configured to correlate the senses environmental conditions with the particular regions and, therefore, may utilize the captured environmental data when processing event data received from fall protection equipment 11. For example, PPEMS 6 may utilize the environmental data to aid generating alerts or other instructions for fall protection equipment 11 and for performing predictive analytics, such as determining any correlations between certain environmental conditions (e.g., wind speed, heat, humidity, visibility) with abnormal worker behavior or increased safety events. As such, PPEMS 6 may utilize current environmental conditions to aid prediction and avoidance of imminent safety events. Example environmental conditions that may be sensed by sensing devices 21 include but are not limited to temperature, humidity, presence of gas, pressure, visibility, wind speed and the like.

In example implementations, an environment, such as environment 8B, may also include one or more safety stations 15 distributed throughout the environment to provide viewing stations for accessing PPEMs 6. Safety stations 15 may allow one of workers 10 to check out fall protection equipment 11 and/or other safety equipment, verify that safety equipment is appropriate for a particular one of environments 8, and/or exchange data. For example, safety stations 15 may transmit alert rules, software updates, or firmware updates to fall protection equipment 11 or other equipment. Safety stations 15 may also receive data cached on fall protection equipment 11, hubs 14, and/or other safety equipment. That is, while fall protection equipment 11 (and/or data hubs 14) may typically transmit usage data from sensors of fall protection equipment 11 to network 4, in some instances, fall protection equipment 11 (and/or data hubs 14) may not have connectivity to network 4. In such instances, fall protection equipment 11 (and/or data hubs 14) may store usage data locally and transmit the usage data to safety stations 15 upon being in proximity with safety stations 15. Safety stations 15 may then upload the data from fall protection equipment 11 and connect to network 4.

In addition, each of environments 8 include computing facilities that provide an operating environment for end-user computing devices 16 for interacting with PPEMS 6 via network 4. For example, each of environments 8 typically includes one or more safety managers responsible for overseeing safety compliance within the environment. In general, each user 20 interacts with computing devices 16 to access PPEMS 6. Each of environments 8 may include systems. Similarly, remote users may use computing devices 18 to interact with PPEMS via network 4. For purposes of example, the end-user computing devices 16 may be laptops, desktop computers, mobile devices such as tablets or so-called smart phones and the like.

Users 20, 24 interact with PPEMS 6 to control and actively manage many aspects of safely equipment utilized by workers 10, such as accessing and viewing usage records, analytics and reporting. For example, users 20, 24 may review usage information acquired and stored by PPEMS 6, where the usage information may include data specifying starting and ending times over a time duration (e.g., a day, a week, or the like), data collected during particular events, such as detected falls, sensed data acquired from the user, environment data, and the like. In addition, users 20, 24 may interact with PPEMS 6 to perform asset tracking and to schedule maintenance events for individual pieces of safety equipment, e.g., fall protection equipment 11, to ensure compliance with any procedures or regulations. PPEMS 6 may allow users 20, 24 to create and complete digital checklists with respect to the maintenance procedures and to synchronize any results of the procedures from computing devices 16, 18 to PPEMS 6.

Further, as described herein, PPEMS 6 integrates an event processing platform configured to process thousand or even millions of concurrent streams of events from digitally enabled PPEs, such as fall protection equipment 11. An underlying analytics engine of PPEMS 6 may apply historical data and models to the inbound streams to compute assertions, such as identified anomalies or predicted occurrences of safety events based on conditions or behavior patterns of workers 10. Further, PPEMS 6 may provide real-time alerting and reporting to notify workers 10 and/or users 20, 24 of any predicted events, anomalies, trends, and the like.

The analytics engine of PPEMS 6 may, in some examples, apply analytics to identify relationships or correlations between sensed worker data, environmental conditions, geographic regions and other factors and analyze the impact on safety events. PPEMS 6 may determine, based on the data acquired across populations of workers 10, which particular activities, possibly within certain geographic region, lead to, or are predicted to lead to, unusually high occurrences of safety events.

In this way, PPEMS 6 integrates comprehensive tools for managing personal protection equipment with an underlying analytics engine and communication system to provide data acquisition, monitoring, activity logging, reporting, behavior analytics and alert generation. Moreover, PPEMS 6 provides a communication system for operation and utilization by and between the various elements of system 2. Users 20, 24 may access PPEMS to view results on any analytics performed by PPEMS 6 on data acquired from workers 10. In some examples, PPEMS 6 may present a web-based interface via a web server (e.g., an HTTP server) or client-side applications may be deployed for devices of computing devices 16, 18 used by users 20, 24, such as desktop computers, laptop computers, mobile devices such as smart-phones and tablets, or the like.

In some examples, PPEMS 6 may provide a database query engine for directly querying PPEMS 6 to view acquired safety information, compliance information and any results of the analytic engine, e.g., by the way of dashboards, alert notifications, reports and the like. That is, users 24, 26, or software executing on computing devices 16, 18, may submit queries to PPEMS 6 and receive data corresponding to the queries for presentation in the form of one or more reports or dashboards. Such dashboards may provide various insights regarding system 2, such as baseline ("normal") operation across worker populations, identifications of any anomalous workers engaging in abnormal activities that may potentially expose the worker to risks, identifications of any geographic regions within environments 2 for which unusually anomalous (e.g., high) safety events have been or are predicted to occur, identifications of any of environments 2 exhibiting anomalous occurrences of safety events relative to other environments, and the like.

PPEMS 6 may simplify workflows for individuals charged with monitoring and ensure safety compliance for an entity or environment. That is, the techniques of this disclosure may enable active safety management and allow an organization to take preventative or correction actions with respect to certain regions within environments 8, particular articles of fall protection equipment 11 or individual workers 10, define and may further allow the entity to implement workflow procedures that are data-driven by an underlying analytical engine.

As one example, the underlying analytical engine of PPEMS 6 may be configured to compute and present customer-defined metrics for worker populations within a given environment 8 or across multiple environments for an organization as a whole. For example, PPEMS 6 may be configured to acquire data and provide aggregated performance metrics and predicted behavior analytics across a worker population (e.g., across workers 10 of either or both of environments 8A, 8B). Furthermore, users 20, 24 may set benchmarks for occurrence of any safety incidences, and PPEMS 6 may track actual performance metrics relative to the benchmarks for individuals or defined worker populations.

As another example, PPEMS 6 may further trigger an alert if certain combinations of conditions are present, e.g., to accelerate examination or service of a safety equipment, such as one of fall protection equipment 11. In this manner, PPEMS 6 may identify individual articles of fall protection equipment 11 or workers 10 for which the metrics do not meet the benchmarks and prompt the users to intervene and/or perform procedures to improve the metrics relative to the benchmarks, thereby ensuring compliance and actively managing safety for workers 10.

Figure 2:
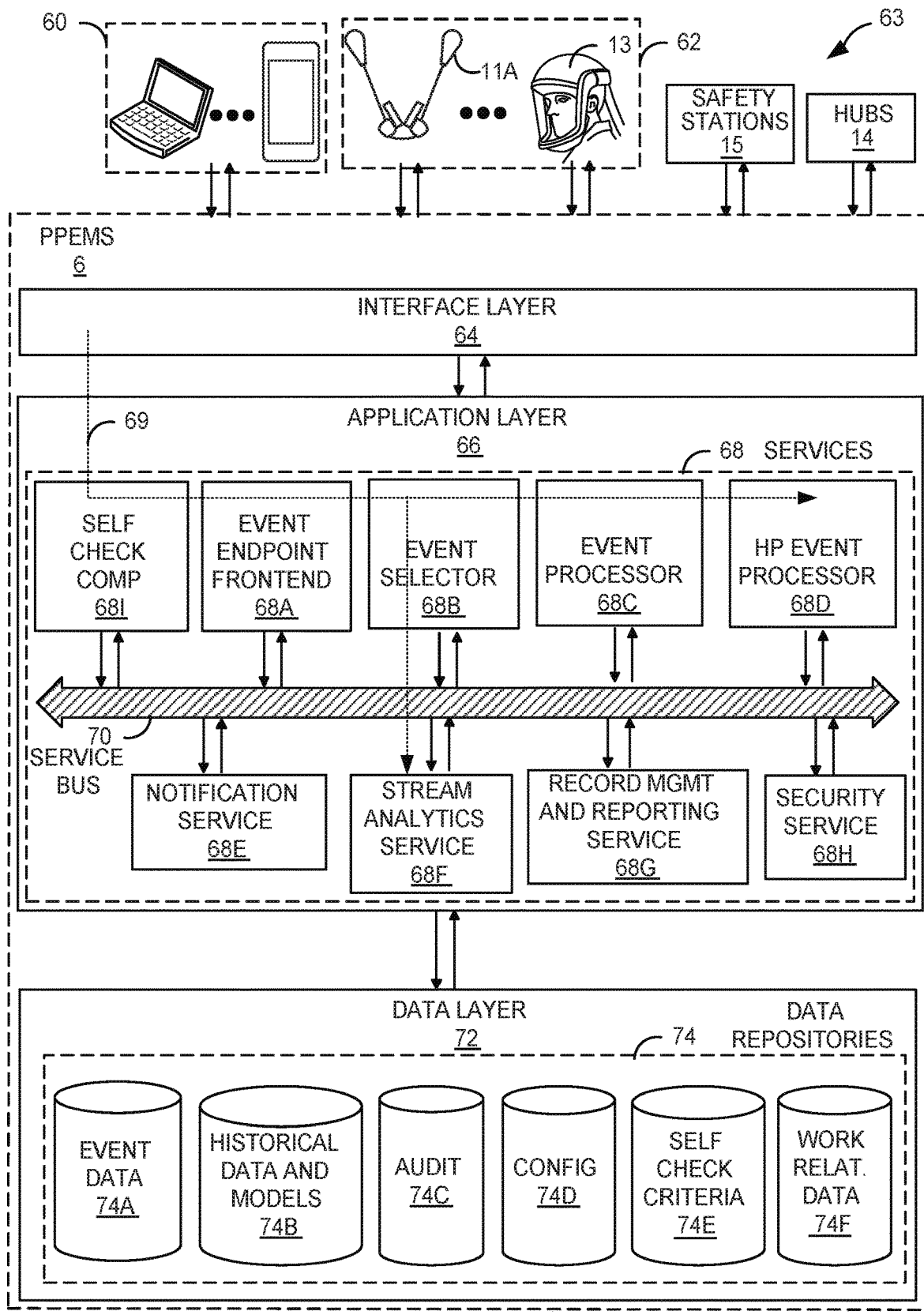
FIG. 2 is a block diagram illustrating an operating perspective of the personal protection equipment management system shown in FIG. 1.

FIG. 2 is a block diagram providing an operating perspective of PPEMS 6 when hosted as cloud-based platform capable of supporting multiple, distinct work environments 8 having an overall population of workers 10 that have a variety of communication enabled personal protection equipment (PPE), such as fall protection equipment 11, respirators 13, safety helmets or other safety equipment. In the example of FIG. 2, the components of PPEMS 6 are arranged according to multiple logical layers that implement the techniques of the disclosure. Each layer may be implemented by one or more modules comprised of hardware, software, or a combination of hardware and software.

In FIG. 2, personal protection equipment (PPEs) 62, such as fall protection equipment 11, respirators 13 and/or other equipment, either directly or by way of hubs 14, as well as computing devices 60, operate as clients 63 that communicate with PPEMS 6 via interface layer 64. Computing devices 60 typically execute client software applications, such as desktop applications, mobile application, and web applications. Computing devices 60 may represent any of computing devices 16, 18 of FIG. 1. Examples of computing devices 60 may include, but are not limited to a portable or mobile computing device (e.g., smartphone, wearable computing device, tablet), laptop computers, desktop computers, smart television platforms, and servers, to name only a few examples.

As further described in this disclosure, PPEs 62 communicate with PPEMS 6 (directly or via hubs 14) to provide streams of data acquired from embedded sensors and other monitoring circuitry and receive from PPEMS 6 alerts, configuration and other communications. Client applications executing on computing devices 60 may communicate with PPEMS 6 to send and receive information that is retrieved, stored, generated, and/or otherwise processed by services 68. For instance, the client applications may request and edit safety event information including analytical data stored at and/or managed by PPEMS 6. In some examples, client applications 61 may request and display aggregate safety event information that summarizes or otherwise aggregates numerous individual instances of safety events and corresponding data acquired from PPEs 62 and or generated by PPEMS 6. The client applications may interact with PPEMS 6 to query for analytics information about past and predicted safety events, behavior trends of workers 10, to name only a few examples. In some examples, the client applications may output for display information received from PPEMS 6 to visualize such information for users of clients 63. As further illustrated and described in below, PPEMS 6 may provide information to the client applications, which the client applications output for display in user interfaces.

Clients applications executing on computing devices 60 may be implemented for different platforms but include similar or the same functionality. For instance, a client application may be a desktop application compiled to run on a desktop operating system, such as Microsoft Windows, Apple OS X, or Linux, to name only a few examples. As another example, a client application may be a mobile application compiled to run on a mobile operating system, such as Google Android, Apple iOS, Microsoft Windows Mobile, or BlackBerry OS to name only a few examples. As another example, a client application may be a web application such as a web browser that displays web pages received from PPEMS 6.

In the example of a web application, PPEMS 6 may receive requests from the web application (e.g., the web browser), process the requests, and send one or more responses back to the web application. In this way, the collection of web pages, the client-side processing web application, and the server-side processing performed by PPEMS 6 collectively provides the functionality to perform techniques of this disclosure. In this way, client applications use various services of PPEMS 6 in accordance with techniques of this disclosure, and the applications may operate within various different computing environment (e.g., embedded circuitry or processor of a PPE, a desktop operating system, mobile operating system, or web browser, to name only a few examples).

As shown in FIG. 2, PPEMS 6 includes an interface layer 64 that represents a set of application programming interfaces (API) or protocol interface presented and supported by PPEMS 6. Interface layer 64 initially receives messages from any of clients 63 for further processing at PPEMS 6. Interface layer 64 may therefore provide one or more interfaces that are available to client applications executing on clients 63. In some examples, the interfaces may be application programming interfaces (APIs) that are accessible over a network. Interface layer 64 may be implemented with one or more web servers. The one or more web servers may receive incoming requests, process and/or forward information from the requests to services 68, and provide one or more responses, based on information received from services 68, to the client application that initially sent the request. In some examples, the one or more web servers that implement interface layer 64 may include a runtime environment to deploy program logic that provides the one or more interfaces. As further described below, each service may provide a group of one or more interfaces that are accessible via interface layer 64.

In some examples, interface layer 64 may provide Representational State Transfer (RESTful) interfaces that use HTTP methods to interact with services and manipulate resources of PPEMS 6. In such examples, services 68 may generate JavaScript Object Notation (JSON) messages that interface layer 64 sends back to the client application 61 that submitted the initial request. In some examples, interface layer 64 provides web services using Simple Object Access Protocol (SOAP) to process requests from client applications 61. In still other examples, interface layer 64 may use Remote Procedure Calls (RPC) to process requests from clients 63. Upon receiving a request from a client application to use one or more services 68, interface layer 64 sends the information to application layer 66, which includes services 68.

As shown in FIG. 2, PPEMS 6 also includes an application layer 66 that represents a collection of services for implementing much of the underlying operations of PPEMS 6. Application layer 66 receives information included in requests received from client applications 61 and further processes the information according to one or more of services 68 invoked by the requests. Application layer 66 may be implemented as one or more discrete software services executing on one or more application servers, e.g., physical or virtual machines. That is, the application servers provide runtime environments for execution of services 68. In some examples, the functionality interface layer 64 as described above and the functionality of application layer 66 may be implemented at the same server.

Application layer 66 may include one or more separate software services 68, e.g., processes that communicate, e.g., via a logical service bus 70 as one example. Service bus 70 generally represents logical interconnections or set of interfaces that allows different services to send messages to other services, such as by a publish/subscription communication model. For instance, each of services 68 may subscribe to specific types of messages based on criteria set for the respective service.

When a service publishes a message of a particular type on service bus 70, other services that subscribe to messages of that type will receive the message. In this way, each of services 68 may communicate information to one another. As another example, services 68 may communicate in point-to-point fashion using sockets or other communication mechanism. In still other examples, a pipeline system architecture could be used to enforce a workflow and logical processing of data messages as they are process by the software system services. Before describing the functionality of each of services 68, the layers are briefly described herein.

Data layer 72 of PPEMS 6 represents a data repository that provides persistence for information in PPEMS 6 using one or more data repositories 74. A data repository, generally, may be any data structure or software that stores and/or manages data. Examples of data repositories include but are not limited to relational databases, multi-dimensional databases, maps, and hash tables, to name only a few examples. Data layer 72 may be implemented using Relational Database Management System (RDBMS) software to manage information in data repositories 74. The RDBMS software may manage one or more data repositories 74, which may be accessed using Structured Query Language (SQL). Information in the one or more databases may be stored, retrieved, and modified using the RDBMS software. In some examples, data layer 72 may be implemented using an Object Database Management System (ODBMS), Online Analytical Processing (OLAP) database or other suitable data management system.

As shown in FIG. 2, each of services 68A-68H ("services 68") is implemented in a modular form within PPEMS 6. Although shown as separate modules for each service, in some examples the functionality of two or more services may be combined into a single module or component. Each of services 68 may be implemented in software, hardware, or a combination of hardware and software. Moreover, services 68 may be implemented as standalone devices, separate virtual machines or containers, processes, threads or software instructions generally for execution on one or more physical processors.

In some examples, one or more of services 68 may each provide one or more interfaces that are exposed through interface layer 64. Accordingly, client applications of computing devices 60 may call one or more interfaces of one or more of services 68 to perform techniques of this disclosure.

In accordance with techniques of the disclosure, services 68 may include an event processing platform including an event endpoint frontend 68A, event selector 68B, event processor 68C and high priority (HP) event processor 68D. Event endpoint frontend 68A operates as a front-end interface for receiving and sending communications to PPEs 62 and hubs 14. In other words, event endpoint frontend 68A operates to as a front-line interface to safety equipment deployed within environments 8 and utilized by workers 10.

In some instances, event endpoint frontend 68A may be implemented as a plurality of tasks or jobs spawned to receive individual inbound communications of event streams 69 from the PPEs 62 carrying data sensed and captured by the safety equipment. When receiving event streams 69, for example, event endpoint frontend 68A may spawn tasks to quickly enqueue an inbound communication, referred to as an event, and close the communication session, thereby providing high-speed processing and scalability. Each incoming communication may, for example, carry data recently captured data representing sensed conditions, motions, temperatures, actions or other data, generally referred to as events. Communications exchanged between the event endpoint frontend 68A and the PPEs may be real-time or pseudo real-time depending on communication delays and continuity.

Event selector 68B operates on the stream of events 69 received from PPEs 62 and/or hubs 14 via frontend 68A and determines, based on rules or classifications, priorities associated with the incoming events. Based on the priorities, event selector 68B enqueues the events for subsequent processing by event processor 68C or high priority (HP) event processor 68D. Additional computational resources and objects may be dedicated to HP event processor 68D so as to ensure responsiveness to critical events, such as incorrect usage of PPEs, use of incorrect filters and/or respirators based on geographic locations and conditions, failure to properly secure fall protection equipment 11 and the like. Responsive to processing high priority events, HP event processor 68D may immediately invoke notification service 68E to generate alerts, instructions, warnings or other similar messages to be output to fall protection equipment 11, hubs 14 and/or remote users 20, 24. Events not classified as high priority are consumed and processed by event processor 68C.

In general, event processor 68C or high priority (HP) event processor 68D operate on the incoming streams of events to update event data 74A within data repositories 74. In general, event data 74A may include all or a subset of usage data obtained from PPEs 62. For example, in some instances, event data 74A may include entire streams of samples of data obtained from electronic sensors of PPEs 62. In other instances, event data 74A may include a subset of such data, e.g., associated with a particular time period or activity of PPEs 62.

Event processors 68C, 68D may create, read, update, and delete event information stored in event data 74A. Event information for may be stored in a respective database record as a structure that includes name/value pairs of information, such as data tables specified in row/column format. For instance, a name (e.g., column) may be "worker ID" and a value may be an employee identification number. An event record may include information such as, but not limited to: worker identification, PPE identification, acquisition timestamp(s) and data indicative of one or more sensed parameters.

In addition, event selector 68B directs the incoming stream of events to stream analytics service 68F, which represents an example of an analytics engine configured to perform in depth processing of the incoming stream of events to perform real-time analytics. Stream analytics service 68F may, for example, be configured to process and compare multiple streams of event data 74A with historical data and models 74B in real-time as event data 74A is received. In this way, stream analytic service 68D may be configured to detect anomalies, transform incoming event data values, trigger alerts upon detecting safety concerns based on conditions or worker behaviors.

Historical data and models 74B may include, for example, specified safety rules, business rules and the like. In this way, historical data and models 74B may characterize activity of a user of fall protection equipment 11, e.g., as conforming to the safety rules, business rules, and the like. In addition, stream analytic service 68D may generate output for communicating to PPPEs 62 by notification service 68F or computing devices 60 by way of record management and reporting service 68D.

Analytics service 68F may process inbound streams of events, potentially hundreds or thousands of streams of events, from enabled safety PPEs 62 utilized by workers 10 within environments 8 to apply historical data and models 74B to compute assertions, such as identified anomalies or predicted occurrences of imminent safety events based on conditions or behavior patterns of the workers. Analytics service may 68D publish the assertions to notification service 68F and/or record management by service bus 70 for output to any of clients 63.

In this way, analytics service 68F may configured as an active safety management system that predicts imminent safety concerns and provides real-time alerting and reporting. In addition, analytics service 68F may be a decision support system that provides techniques for processing inbound streams of event data to generate assertions in the form of statistics, conclusions, and/or recommendations on an aggregate or individualized worker and/or PPE basis for enterprises, safety officers and other remote users. For instance, analytics service 68F may apply historical data and models 74B to determine, for a particular worker, the likelihood that a safety event is imminent for the worker based on detected behavior or activity patterns, environmental conditions and geographic locations.

In some examples, analytics service 68F may generate user interfaces based on processing information stored by PPEMS 6 to provide actionable information to any of clients 63. For example, analytics service 68F may generate dashboards, alert notifications, reports and the like for output at any of clients 63. Such information may provide various insights regarding baseline ("normal") operation across worker populations, identifications of any anomalous workers engaging in abnormal activities that may potentially expose the worker to risks, identifications of any geographic regions within environments for which unusually anomalous (e.g., high) safety events have been or are predicted to occur, identifications of any of environments exhibiting anomalous occurrences of safety events relative to other environments, and the like.

Although other technologies can be used, in one example implementation, analytics service 68F utilizes machine learning when operating on streams of safety events so as to perform real-time analytics. That is, analytics service 68F includes executable code generated by application of machine learning to training data of event streams and known safety events to detect patterns. The executable code may take the form of software instructions or rule sets and is generally referred to as a model that can subsequently be applied to event streams 69 for detecting similar patterns and predicting upcoming events.

Analytics service 68F may, in some example, generate separate models for a particular worker, a particular population of workers, a particular environment, or combinations thereof. Analytics service 68F may update the models based on usage data received from PPEs 62. For example, analytics service 68F may update the models for a particular worker, a particular population of workers, a particular environment, or combinations thereof based on data received from PPEs 62.

Alternatively, or in addition, analytics service 68F may communicate all or portions of the generated code and/or the machine learning models to hubs 14 (or PPEs 62) for execution thereon so as to provide local alerting in near-real time to PPEs. Example machine learning techniques that may be employed to generate models 74B can include various learning styles, such as supervised learning, unsupervised learning, and semi-supervised learning. Example types of algorithms include Bayesian algorithms, Clustering algorithms, decision-tree algorithms, regularization algorithms, regression algorithms, instance-based algorithms, artificial neural network algorithms, deep learning algorithms, dimensionality reduction algorithms and the like. Various examples of specific algorithms include Bayesian Linear Regression, Boosted Decision Tree Regression, and Neural Network Regression, Back Propagation Neural Networks, the Apriori algorithm, K-Means Clustering, k-Nearest Neighbour (kNN), Learning Vector Quantization (LVQ), Self-Organizing Map (SOM), Locally Weighted Learning (LWL), Ridge Regression, Least Absolute Shrinkage and Selection Operator (LASSO), Elastic Net, and Least-Angle Regression (LARS), Principal Component Analysis (PCA) and Principal Component Regression (PCR).

Record management and reporting service 68G processes and responds to messages and queries received from computing devices 60 via interface layer 64. For example, record management and reporting service 68G may receive requests from client computing devices for event data related to individual workers, populations or sample sets of workers, geographic regions of environments 8 or environments 8 as a whole, individual or groups/types of PPEs 62. In response, record management and reporting service 68G accesses event information based on the request. Upon retrieving the event data, record management and reporting service 68G constructs an output response to the client application that initially requested the information.

As additional examples, record management and reporting service 68G may receive requests to find, analyze, and correlate PPE event information. For instance, record management and reporting service 68G may receive a query request from a client application for event data 74A over a historical time frame, such as a user can view PPE event information over a period of time and/or a computing device can analyze the PPE event information over the period of time.

In example implementations, services 68 may also include security service 68H that authenticate and authorize users and requests with PPEMS 6. Specifically, security service 68H may receive authentication requests from client applications and/or other services 68 to access data in data layer 72 and/or perform processing in application layer 66. An authentication request may include credentials, such as a username and password. Security service 68H may query security data 74A to determine whether the username and password combination is valid. Configuration data 74D may include security data in the form of authorization credentials, policies, and any other information for controlling access to PPEMS 6. As described above, security data 74A may include authorization credentials, such as combinations of valid usernames and passwords for authorized users of PPEMS 6. Other credentials may include device identifiers or device profiles that are allowed to access PPEMS 6.

Security service 68H may provide audit and logging functionality for operations performed at PPEMS 6. For instance, security service 68H may log operations performed by services 68 and/or data accessed by services 68 in data layer 72. Security service 68H may store audit information such as logged operations, accessed data, and rule processing results in audit data 74C. In some examples, security service 68H may generate events in response to one or more rules being satisfied. Security service 68H may store data indicating the events in audit data 74C.

PPEMS 6 may include self-check component 68I, self-check criteria 74E and work relation data 74F. Self-check criteria 74E may include one or more self-check criterion. Work relation data 74F may include mappings between data that corresponds to PPE, workers, and work environments. Work relation data 74F may be any suitable datastore for storing, retrieving, updating and deleting data. Work relation data store 74F may store a mapping between the unique identifier of worker 10A and a unique device identifier of data hub 14A. Work relation data store 74F may also map a worker to an environment. In the example of FIG. 2, self-check component 68I may receive or otherwise determine data from work relation data 74F for data hub 14A, worker 10A, and/or PPE associated with or assigned to worker 10A. Based on this data, self-check component 68I may select one or more self-check criteria from self-check criteria 74E. Self-check component 68I may send the self-check criteria to data hub 14A.

Figure 3:
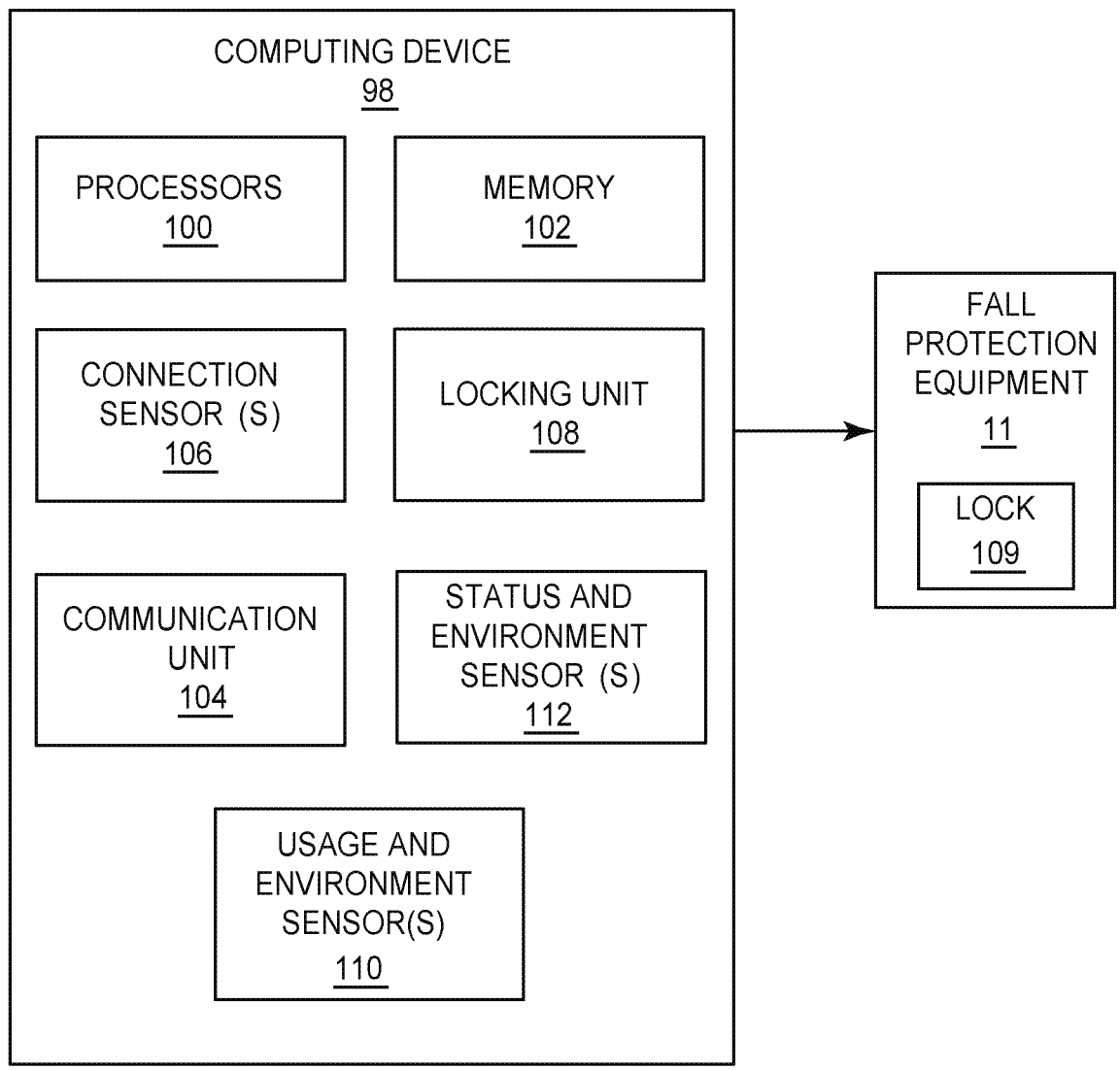
FIG. 3 is a block diagram illustrating one example of a computing device that may be used to monitor and/or control fall protection equipment in accordance with aspects of this disclosure.

FIG. 3 illustrates an example of a computing device that may be incorporated in an article of fall protection equipment 11. In the illustrated example, computing device 98 includes processors 100, memory 102, communication unit 104, one or more connection sensors 106, fall protection unit 108, one or more usage and environment sensors 110, and output unit 112. It should be understood that the architecture and arrangement of computing device 98 illustrated in FIG. 3 is shown for exemplary purposes only. In other examples, computing device 98 incorporated in an article of fall protection equipment may be configured in a variety of other ways having additional, fewer, or alternative components than those shown in FIG. 3. For example, as described in greater detail below, computing device 98 may be configured to include only a subset of components, such as communication unit 104 and connection sensors 106 and may offload certain processing functions to anther device, such as one of hubs 14.

In general, computing device 98 may include a plurality of sensors that may capture real-time data regarding operation of fall protection equipment 11 and/or an environment in which fall protection equipment 11 is used. Such data may be referred to herein as usage data. Processors 100, in one example, are configured to implement functionality and/or process instructions for execution within computing device 98. For example, processors 100 may be capable of processing instructions stored by memory 102. Processors 100 may include, for example, microprocessors, digital signal processors (DSPs), application specific integrated circuits (ASICs), field-programmable gate array (FPGAs), or equivalent discrete or integrated logic circuitry.

Memory 102 may include a computer-readable storage medium or computer-readable storage device. In some examples, memory 102 may include one or more of a short-term memory or a long-term memory. Memory 102 may include, for example, random access memories (RAM), dynamic random access memories (DRAM), static random access memories (SRAM), magnetic hard discs, optical discs, flash memories, or forms of electrically programmable memories (EPROM) or electrically erasable and programmable memories (EEPROM).

In some examples, memory 102 may store an operating system (not shown) or other application that controls the operation of components of computing device 98. For example, the operating system may facilitate the communication of data from electronic sensors (e.g., connection sensors 106) to communication unit 104. In some examples, memory 102 is used to store program instructions for execution by processors 100. Memory 102 may also be configured to store information within computing device 98 during operation.

Computing device 98 may use communication unit 104 to communicate with external devices via one or more wired or wireless connections. Communication unit 104 may include various mixers, filters, amplifiers and other components designed for signal modulation, as well as one or more antennas and/or other components designed for transmitting and receiving data. Communication unit 104 may send and receive data to other computing devices using any one or more suitable data communication techniques. Examples of such communication techniques may include TCP/IP, Ethernet, Wi-Fi, Bluetooth, 4G, LTE, to name only a few examples. In some instances, communication unit 104 may operate in accordance with the Bluetooth Low Energy (BLU) protocol.

Connection sensors 106 may include a wide variety of sensors incorporated in fall protection equipment 11 and configured to generate output data indicative of an operation of fall protection equipment 11 or a characteristic of fall protection equipment 11. For example, the connection sensors 106 may capture data that is indicative of a relative position of a component of fall protection equipment 11 or data that is indicative of whether a support structure is disposed within an area of attachment for fall protection equipment 11. Example connection sensors 106 include one or more switches, hall effect sensors, magnetic sensors, optical sensors, ultrasonic sensors, photoelectric sensors, rotary encoders, accelerometers, or the like. Particular examples of connection sensors 106 are described with respect to the examples of FIGS. 4 and 5 below.

Fall protection unit 108 may include any combination of hardware and software (e.g., executable by processors 100) to control the operation of a lock 109 (as described in greater detail, for example, with respect to FIGS. 4-6 below) incorporated in fall protection equipment 11. As described herein, a lock may include any device capable of impeding or preventing fall protection equipment 11 from being disconnected from a support structure. As merely one example and as described in greater detail with respect to the example shown in FIG. 6, lock 109 may include a solenoid that extends to prevent the movement of one or more components of fall to protection equipment 11 to impede or prevent fall protection equipment from being disconnected from a support structure. Fall protection unit 108 may control the operation of lock 109 and/or feedback component 113, e.g., based on data from connection sensors 106.

Usage and environment sensors 110 may include a wide variety of sensors that capture data indicative of manner in which of fall protection equipment 11 is being used or an environment in which fall protection equipment 11 is disposed. For example, usage and environment sensors 110 may include accelerometers, location sensors, altimeters, or the like. In this example, an accelerometer may be configured to generate data indicative of an acceleration of fall protection equipment 11 with respect to gravity. An accelerometer may be configured as a single- or multi-axis accelerometer to determine a magnitude and direction of acceleration, e.g., as a vector quantity, and may be used to determine orientation, coordinate acceleration, vibration, shock, and/or falling. A location sensor may be configured to generate data indicative of a location of fall protection equipment 11 in one of environments 8. The location sensor may include a Global Positioning System (GPS) receiver, componentry to perform triangulation (e.g., using beacons and/or other fixed communication points), or other sensors to determine the relative location of fall protection equipment 11. An altimeter may be configured to generate data indicative of an altitude of fall protection equipment 11 above a fixed level. In some examples, the altimeter may be configured to determine altitude of fall protection equipment 11 based on a measurement of atmospheric pressure (e.g., the greater the altitude, the lower the pressure). In addition, status and environment sensors 110 may include one or more sensors configured to measure wind speed, temperature, humidity, particulate content, noise levels, air quality, or any variety of other characteristics of environments in which fall protection equipment 11 may be used.

Output unit 112 may be configured to output data that is indicative of operation of fall protection equipment 11, e.g., as measured by one or more sensors of computing device 98. In some examples, output unit 112 may directly output the data from the sensors of computing device 98. For example, output unit 112 may generate one or more messages containing real-time or near real-time data from one or more sensors of computing device 98 for transmission to another device via communication unit 104. However, in some instances, communication unit 104 may not be able to communicate with such devices, e.g., due to an environment in which fall protection equipment 11 is located and/or network outages. In such instances, output unit 112 may cache usage data to memory 102. That is, output unit 112 (or the sensors themselves) may store usage data to memory 102, which may allow the usage data to be uploaded to another device upon a network connection becoming available.

Output unit 112 may also be configured to generate an audible, visual, tactile, or other output that is perceptible by a user of fall protection equipment 11. For example, output unit 112 may include one more user interface devices including, as examples, a variety of lights, displays, haptic feedback generators, speakers or the like. In one example, output unit 112 may include one or more light emitting diodes (LEDs) that are located on fall protection equipment 11 and/or included in a remote device that is in a field of view of a user of fall protection equipment 11 (e.g., indicator glasses, visor, or the like). In another example, output unit 112 may include one or more speakers that are located on fall protection equipment 11 and/or included in a remote device (e.g., earpiece, headset, or the like). In still another example, output unit 112 may include a haptic feedback generator that generates a vibration or other tactile feedback and that is included on fall protection equipment 11 or a remote device (e.g., a bracelet, a helmet, an earpiece, or the like). In still another example, output unit 112 may generate an electronic message for transmission to another computing device, such as end-user computing devices 16, computing devices 18, safety stations 15, hubs 14 (FIG. 1) or any other computing device.

In operation, fall protection unit 108 (or another computing device capable of communicating with computing device 98) may use data from connection sensors 106 to determine whether fall protection equipment 11 is connected to a support structure. For example, fall protection unit 108 may receive data from connections sensors 106 that indicates a status or an operation of components of fall protection equipment 11. Fall protection unit 108 may determine a connection status of a plurality of articles of fall protection equipment 11 based on the received data. For example, fall protection unit 108 may determine that a particular article of fall protection equipment 11 is connected to a support structure based on data indicating that components of fall protection equipment 11 have been moved to allow connection to the support structure and that the support structure is disposed within an area of attachment of fall protection equipment 11.

In some instances, fall protection unit 108 may control the operation of lock 109 and/or feedback component 113 based on the determined connection status. For example, based on determining that a particular article of fall protection equipment 11 is the only fall protection equipment 11 that is connected to the support structure (e.g., according to the determined connection status), fall protection unit 108 may actuate lock 109 in order to impede or prevent fall protection equipment 11 from being disconnected from the support structure.

In some examples, lock 109 may be a secondary or tertiary lock of fall protection equipment 11. For example, certain safety standards or codes may require at least two separate and deliberate actions for components of fall protection equipment 11 to move (e.g., for a gate to move), thereby allowing fall protection equipment 11 to connect to or disconnect from a support structure. As described in greater detail below with respect to FIGS. 4 and 5, each separate and deliberate action may be associated with a locking mechanism. According to aspects of this disclosure, lock 109 may prevent one or more of such locking mechanisms from being operated, e.g., from being opened to allow disconnection from the support structure.

Fall protection unit 108 may also release lock 109. For example, after actuating lock 109, fall protection unit 108 may continue to monitor whether fall protection equipment 11 is connected to the support structure. In the event that one or more other articles of fall protection equipment 11 are connected to the support structure, fall protection unit 108 may release lock 109 such that lock 109 no longer impedes fall protection equipment 11 from being disconnected from the support structure.

In the event that fall protection unit 108 actuates lock 109, output unit 112 may generate a signal that indicates lock 109 has been actuated. For example, as described above, output unit 112 may generate an audible, visual, and/or tactile output that indicates lock 109 has been actuated. In some examples, output unit 112 may additionally or alternatively generate an electronic message that indicates lock 109 has been actuated for transmission to another computing device, such as end-user computing devices 16, computing devices 18, safety stations 15, hubs 14 (FIG. 1) or any other computing device.

In some instances, lock 109 may incorporate a manual override. For example, a user may manually perform one or more actions to release lock 109 from a locked position to an unlocked position. In addition to or instead of the alerts described above, output unit 112 may generate a signal that indicates lock 109 has been manually overridden by a user of fall protection equipment 11. For example, output unit 112 may generate an electronic message, an audible output, a visual output, and/or tactile output that indicates a manual override has been performed.

In some examples, rather than actuating lock 109 (or in addition to actuating lock 109), fall protection unit 108 may actuate feedback component 113 based on the determined connection status. For example, based on determining that a particular article of fall protection equipment 11 is the only fall protection equipment 11 that is connected to the support structure (e.g., according to the determined connection status), fall protection unit 108 may generate alert data and transmit the alert data to feedback component 113. Upon receiving the alert data, fall protection equipment 11 may generate an alert that indicates that the first article of fall protection equipment is the only article of fall protection equipment that is connected to the at least one support structure. That is, in some examples, feedback component 113 may generate an audible alert (e.g., via one or more speakers), a visual alert (e.g., via one or more displays, light emitting diodes (LEDs) or the like), or a tactile alert (e.g., via a component of fall protection equipment 11 that vibrates or provides other haptic feedback). In other examples, as noted above, output unit 112 may generate an electronic message that indicates the connection status, e.g., for transmission to another device such as computing devices 18 (FIG. 1). In some examples, according to aspects of this disclosure, fall protection unit 108 may determine whether a fall has occurred. For example, fall protection unit 108 may receive data from connection sensors 106 that indicates a load being applied to fall protection equipment 11. In response to the load exceeding a predetermined threshold, fall protection unit 108 may generate an audible, visual or tactile alert for output by output unit 112. In some examples, fall protection unit 108 may also determine a duration with which the load is applied, e.g., to determine not only that a user has fallen (thereby generating the load), but is also suspended post fall.

Figure 4:
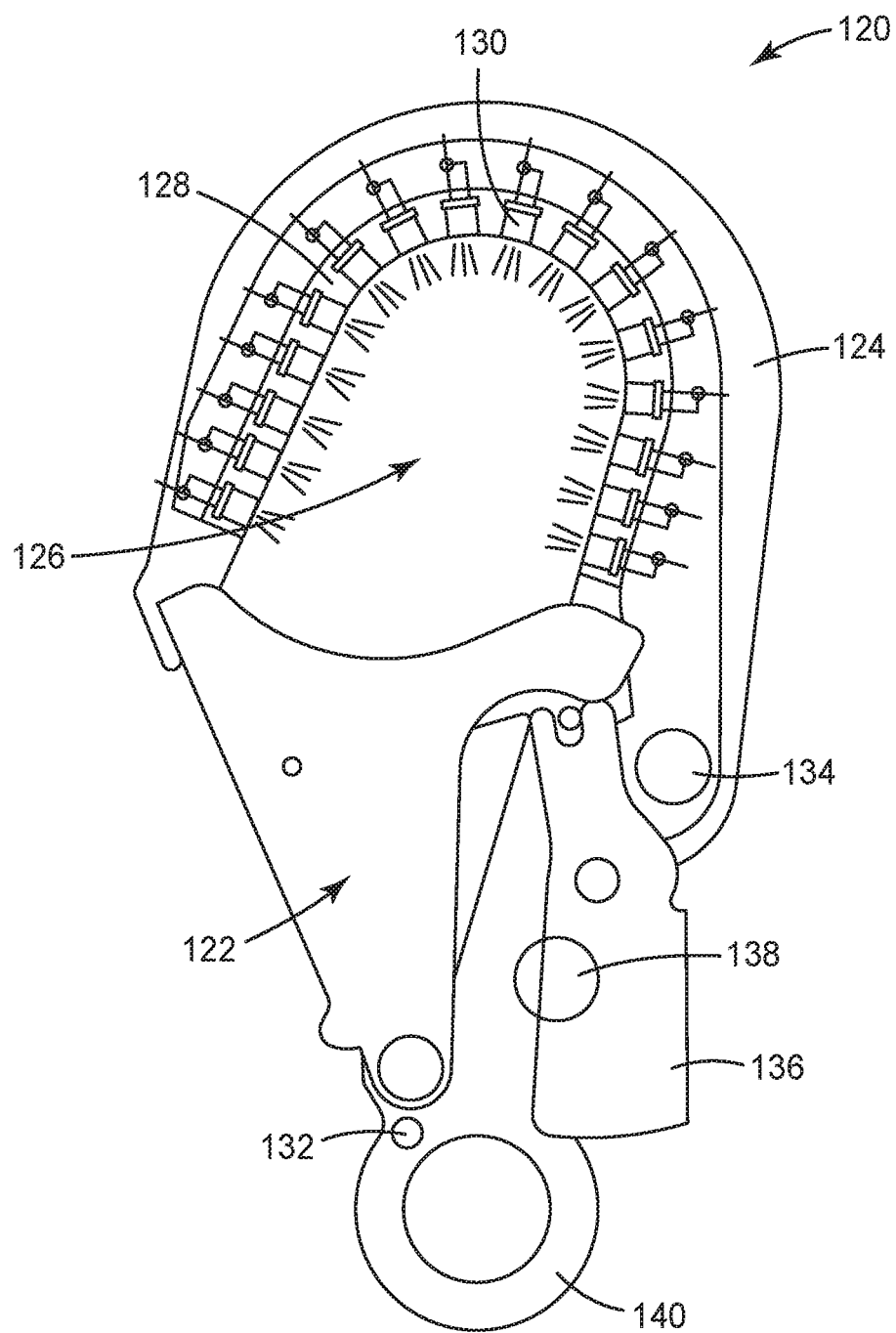
FIG. 4 illustrates an example of a carabiner that is configured in accordance with aspects of this disclosure.

FIG. 4 illustrates an example of a snap hook 120 that is configured in accordance with aspects of this disclosure. While the example illustrated in FIG. 4 comprises a snap hook, it should be understood that the techniques described herein may be applied to a variety of other devices for securing a user to an anchor, such as a carabiner. For example, a carabiner may be constructed similarly to snap hook 120, but may rely on a rotating or self-locking gate mechanism instead of the planar lock mechanism shown in FIG. 4.

The example snap hook 120 of FIG. 4 includes a movable gate 122 and a body 124 that generally defines an area of attachment 126 within which a support structure is disposed when snap hook 120 is connected to the support structure. Snap hook 120 also includes first sensor 128 having sensor elements 130, second sensor 132, computing device 134, primary locking mechanism 136, and lock 138. Snap hook 120 may be attached to, for example, an energy absorbing lanyard, a self-retracting lanyard, or another device via attachment point 140.

Movable gate 122 moves between an open position and a closed position. The example of FIG. 4 illustrates movable gate 122 in the closed position such that movable gate 122 contacts body 120 and creates a continuous loop that defines area of attachment 126. In the open position, movable gate 122 pivots inward toward area of attachment 126 and allows a support structure to be moved into area of attachment 126.

First sensor 128 may be configured to generate data that indicates whether a material (such as a support structure) is disposed within area of attachment 126. In the illustrated example, first sensor 128 includes elements 130 that outputs a signal in response to a magnetic field. In this example, first sensor 128 may generate data that indicates whether a ferrous material is disposed within area of attachment 126.

In an example for purposes of illustration, first sensor 128 may include a printed circuit board and elements 130 may include Hall Effect elements that are incorporated in the printed circuit board. In some instances, permanent magnets may be positioned at the relative ends of first sensor 128. When a ferrous object is in proximity to body 122, magnetic field lines change shape due to the tendency of electromagnetic fields to be attracted to permeable objects. This change in the magnetic field results in a change in magnetic flux that is measured using the Hall Effect elements.

In other examples, first sensor 128 may include a variety of other contact or non-contact sensors. For example, first sensor 128 may include any combination of reed switches, inductive sensors, ultrasonic sensors, photoelectric sensors, mechanical sensors, switches, or any other sensor capable of generating an output based on a material being disposed within area of attachment 126.

Second sensor 132 may be configured to generate data that indicates movement of gate 122. For example, second sensor 132 may be configured to generate a signal that indicates that gate 122 has been moved from the closed position to the open position or vice versa. In some examples, second sensor 132 may output a discrete signal (e.g., a signal that indicates whether gate 122 is in the open position or closed position). In other examples, second sensor 132 may output data indicative of a relative position of gate 122. Second sensor 132 may include any sensor capable of generating an output based on a position or movement of gate 122, such as one or more switches, rotary encoders, accelerometers, or the like.

Computing device 134 may include computing components responsible for processing and/or transmitting data generated by first sensor 128 and second sensor 132. Computing device 134 may also include a power source, such as a battery. In some examples, computing device 134 may be configured to include the components of computing device 98 shown in FIG. 3. In other examples, computing device 134 may include a subset of computing device 98. For example, computing device 134 may simply include one or more processors and a communication unit for transmitting data from first sensor 128 and second sensor 132 to another computing device.

Primary locking mechanism 136 is configured to prevent gate 122 from being moved to the open position. For example, primary locking mechanism 136 includes a component that engages with gate 122 to prevent gate 122 from pivoting toward area of attachment 126. When a user operates primary locking mechanism 136 (e.g., a user squeezes primary locking mechanism 136) the component of primary locking mechanism 136 disengages from gate 122 to allow gate to be moved toward area of attachment 126.

According to aspects of this disclosure, lock 138 may be configured to impede or prevent gate 122 from being moved from a closed position to an open position based on a connection status of snap hook 120, thereby impeding or preventing snap hook 120 from being disconnected from a support structure. For example, computing device 134 (and/or another computing device in communication with snap hook 120) may determine whether snap hook 120 is connected to a support structure based on data from first sensor 128. That is, computing device 134 may receive data from first sensor 128 that indicates that a support structure is present within area of attachment 126. Computing device 134 may determine a connection status based on such data. For example, computing device 134 may determine that snap hook 120 is connected when the support structure is present and disconnected when the support structure is not present.

In some examples, computing device 134 may also or alternatively use data from second sensor 132 to determine the connection status. For example, computing device 132 may determine that snap hook 120 has been connected to a support structure based on a number of ordered operations. In this example, computing device 134 may receive data from second sensor 132 that indicates that gate 122 has moved to an open position. Computing device 134 may the receive data from first sensor 128 indicating that a support structure is disposed within area of attachment 126. Computing device 134 may then receive data from second sensor 132 that indicates that gate 122 has moved to a closed position and determine that snap hook 120 has been connected to the support structure.

Computing device 134 may operate first sensor 128 based on data from second sensor 132. For example, upon receiving data from second sensor 132 that gate 122 has moved to an open position, computing device 134 may activate first sensor 128 in order to identify a support structure within area of attachment 126.

After determining that snap hook 120 has been connected to a support structure, computing device 134 (or another computing device in communication with snap hook 120) may monitor the status of one or more other articles of fall protection equipment being used by the same user (referred to herein as a set of fall protection equipment). For example, computing device 134 may identify when the other articles of fall protection equipment are connected to and disconnected from one or more support structure, e.g., as a worker moves throughout a worksite. Computing device 134 may determine when snap hook 120 is the only article of fall protection equipment in the set that is connected to the support structure. Based on this determination, computing device 134 may activate lock 138 in order to impede or prevent gate 122 from being to moved from a closed position to an open position based on a connection status of snap hook 120, thereby impeding or preventing snap hook 120 from being disconnected from a support structure.

In some examples, lock 138 may include a locking component that interfaces directly with gate 122 in order to prevent gate 122 from being opened. For example, lock 138 may include a mechanical barrier that prevents 122 from moving. In other examples, lock 138 may be configured to interface with one or more other locking mechanisms of snap hook 120, such as primary locking mechanism 136. For example, lock 138 may include a mechanical barrier that prevents primary locking mechanism 136 from moving, thereby preventing gate 122 from moving.

While the example described with respect to FIG. 4 includes primary locking mechanism 136 and lock 138, other examples may include additional locking mechanisms. For example, certain safety standards or codes may require at least two separate and deliberate actions for gate 122 to open, thereby allowing snap hook 120 to connect to or disconnect from a support structure. Each separate and deliberate action may be associated with a locking mechanism. Example locking mechanisms for snap hook 120 may include latches, spring loaded collars, levers, or any combination of other components that require a deliberate action on the part of the user to operate. According to aspects of this disclosure, lock 138 may be a tertiary locking mechanism that is included in addition to the locking mechanisms associated with the two separate and deliberate actions.

Computing device 134 may also release lock 138. For example, computing device 134 may continue to monitor whether fall protection equipment in the set is connected to the support structure. In the event that one or more other articles of fall protection equipment are connected to the support structure, computing device 134 may release lock 138 such that lock 138 no longer impedes snap hook 120 from being disconnected from the support structure. Additionally or alternatively, lock 138 may include a manual override that allows a user to manually release lock 138.

In the event that computing device 134 actuates lock 138, computing device 134 may generate a signal that indicates lock 138 has been actuated and/or that lock 138 has been manually overridden. In some examples, computing device 134 may generate an electronic message, an audible output, a visual output, and/or tactile output that indicates that lock 138 has been activated and/or a manual override has been performed.

It should be understood that the architecture and arrangement of snap hook 120 illustrated in FIG. 4 is shown for exemplary purposes only. In other examples, snap hook 120 may be configured in a variety of other ways having additional, fewer, or alternative components than those shown in FIG. 4. For example, as noted above, snap hook 120 may be configured to include only a subset of components, such as first sensor 128, second sensor 132, and a communication unit for transmitting data to another computing device, such as one of hubs 14, for performing certain processing functions.

In another example, snap hook 120 may include a feedback component for indicating a connection status of snap hook 120. For example, the feedback component may comprise any variety of speakers, displays, lights, haptic feedback components, or the like to generate an audible alert, a visual alert, or a tactile alert in response to determining that snap hook 120 is the only article of fall protection connected to a support structure.

In still another example, snap hook 120 may include one or more components for determining whether a fall has occurred, such as fall sensor 142. For example, according to aspects of this disclosure, fall sensor 142 may comprise a switch, sensor, or the like for determining a fall condition. In one example, fall sensor 142 may determine deflection, movement, or motion of attachment point 140 to which a line constituent is attached in response to a load. If the load exceeds a predetermined threshold, fall sensor 142 (which may include hall-effect sensors, mechanical switches, or the like) may determine relative movement or a change in shape of attachment point 140.

In addition to generating a signal in the event that attachment point 140 (or another component located near the lower portion of snap hook 120) moves a predetermined amount in response to a given load, the position can also be monitored via sensors for a duration of time to indicate that a specific load has not only been applied to the connector but also applied for a duration. Based on such data, snap hook 120 (or computing device 98) may determine that a user has fallen (thereby generating the load), but is also suspended post fall.

Based on data from fall sensor 142, snap hook 120 (or another device, such as computing device 98) may generate one or more alerts. For example, upon determining that a fall has occurred, fall sensor 142 may generate an audible, visual, or wireless communication (e.g., electronic message) that indicates that the fall has occurred.

Figure 5:
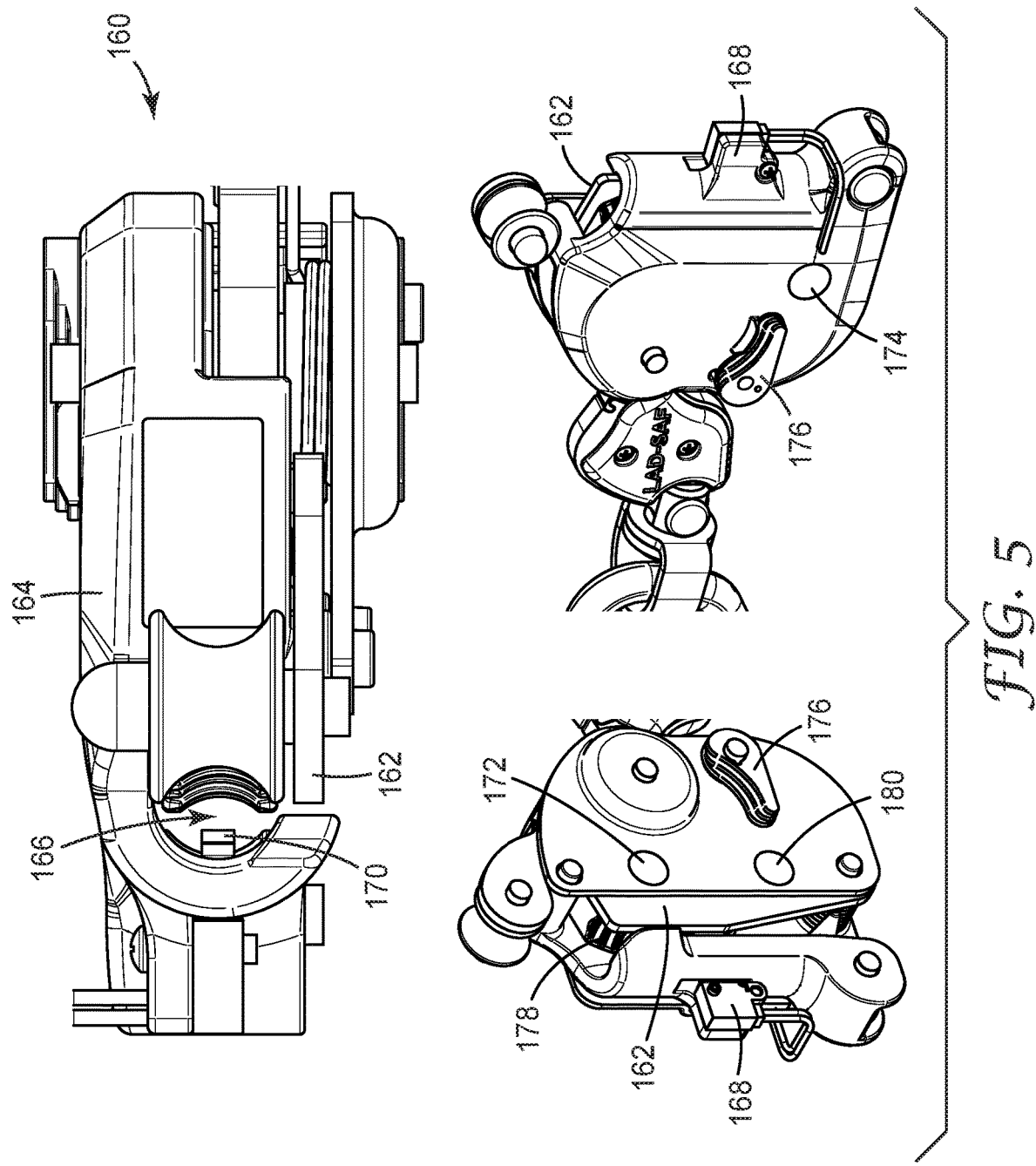
FIG. 5 illustrates an example of a carrier sleeve that is configured in accordance with aspects of this disclosure.

FIG. 5 illustrates an example of a carrier sleeve 160 that is configured in accordance with aspects of this disclosure. The example carrier sleeve 160 of FIG. 5 includes a movable gate 162 and a body 164 that generally defines an area of attachment 166 within which a support structure is disposed when carrier sleeve 160 is connected to the support structure, e.g., a vertically disposed cable that runs through area of attachment 166. Carrier sleeve 160 also to includes first sensor 168 having sensor element 170, second sensor 172, computing device 174, primary locking mechanism 176, secondary locking mechanism 178 and lock 180.

Movable gate 162 moves between an open position and a closed position. The example of FIG. 5 illustrates movable gate 162 in the closed position such that movable gate 162 is positioned proximate to body 164 such that area of attachment 166 is a closed space that prevents a carrier from moving into or out of area of attachment 166. In the open position, movable gate 162 pivots toward body 164 and allows a support structure to be moved into area of attachment 166.

First sensor 168 may be configured to generate data that indicates whether a material (such as a support structure) is disposed within area of attachment 166. In the illustrated example, first sensor 168 includes element 170 that is configured to contact a support structure within area of attachment 166. For example, first sensor 168 may be a contact switch and may generate a signal in response to a support structure coming into contact with element 170. In other examples, first sensor 168 may include a variety of other contact or non-contact sensors. For example, first sensor 168 may include any combination of Hall Effect sensors, reed switches, inductive sensors, ultrasonic sensors, photoelectric sensors, mechanical sensors, switches, or any other sensor capable of generating an output based on a material being disposed within area of attachment 166.

Second sensor 172 may be configured to generate data that indicates movement of gate 162. For example, second sensor 172 may be configured to generate a signal that indicates that gate 162 has been moved from the closed position to the open position or vice versa. In some examples, second sensor 172 may output a discrete signal (e.g., a signal that indicates whether gate 162 is in the open position or closed position). In other examples, second sensor 172 may output data indicative of a relative position of gate 162. Second sensor 172 may include any sensor capable of generating an output based on a position or movement of gate 162, such as one or more switches, rotary encoders, accelerometers, or the like.

Computing device 174 may include computing components responsible for processing and/or transmitting data generated by first sensor 168 and second sensor 172. Computing device 174 may also include a power source, such as a battery. In some examples, computing device 174 may be configured to include the components of computing device 98 shown in FIG. 3. In other examples, computing device 174 may include a subset of computing device 98. For example, computing device 174 may simply include one or more processors and a communication unit for transmitting data from first sensor 168 and second sensor 172 to another computing device.

Primary locking mechanism 176 is configured to prevent gate 162 from being moved to the open position. For example, primary locking mechanism 176 includes a component that engages with gate 162 to prevent gate 162 from moving to the open position. When a user operates primary locking mechanism 176 (e.g., a user rotates or otherwise moves primary locking mechanism 176) the component of primary locking mechanism 176 disengages from gate 162.

Secondary locking mechanism 178 is also configured to prevent gate 162 from being moved to the open position. For example, secondary locking mechanism 178 includes a spring component that prevents gate 162 from moving to the open position without a deliberate action by a user of carrier sleeve 160. When a user operates secondary locking mechanism 178 (e.g., a user presses secondary locking mechanism 178 to bias the spring) gate 162 moves to provide access to area of attachment 166.

According to aspects of this disclosure, lock 180 may be configured to impede or prevent gate 162 from being moved from a closed position to an open position based on a connection status of carrier sleeve 160, thereby impeding or preventing carrier sleeve 160 from being disconnected from a support structure. For example, computing device 174 (and/or another computing device in communication with carrier sleeve 160) may determine whether carrier sleeve 160 is connected to a support structure based on data from first sensor 168. That is, computing device 174 may receive data from first sensor 168 that indicates that a support structure is present within area of attachment 166. Computing device 174 may determine a connection status based on such data. For example, computing device 174 may determine that carrier sleeve 160 is connected when the support structure is present and disconnected when the support structure is not present.

In some examples, computing device 174 may also or alternatively use data from second sensor 172 to determine the connection status. For example, computing device 172 may determine that carrier sleeve 160 has been connected to a support structure based on a number of ordered operations. In this example, computing device 174 may receive data from second sensor 172 that indicates that gate 162 has moved to an open position. Computing device 174 may then receive data from first sensor 168 indicating that a support structure is disposed within area of attachment 166. Computing device 174 may then receive data from second sensor 172 that indicates that gate 162 has moved to a closed position and determine that carrier sleeve 160 has been connected to the support structure.

After determining that carrier sleeve 160 has been connected to a support structure, computing device 174 (or another computing device in communication with carrier sleeve 160) may monitor the status of one or more other articles of fall protection equipment being used by the same user (referred to herein as a set of fall protection equipment). For example, computing device 174 may identify when the other articles of fall protection equipment (such as one or more carabiners 120 (FIG. 4)) are connected to and disconnected from one or more support structure, e.g., as a worker moves throughout a worksite. Computing device 174 may determine when carrier sleeve 160 is the only article of fall protection equipment in the set that is connected to the support structure. Based on this determination, computing device 174 may activate lock 180 in order to impede or prevent gate 162 from being moved from a closed position to an open position based on a connection status of carrier sleeve 160, thereby impeding or preventing carrier sleeve 160 from being disconnected from a support structure.

In some examples, as described with respect to the example of FIG. 6 below, lock 180 may include a locking component that interfaces directly with gate 162 in order to prevent gate 162 from being opened. For example, lock 180 may include a mechanical barrier that prevents 162 from moving. In other examples, lock 180 may be configured to interface with one or more other locking mechanisms of carrier sleeve 160, such as primary locking mechanism 176 or secondary locking mechanism 178. For example, lock 180 may include a mechanical barrier that prevents primary locking mechanism 176 from being moved or rotated, thereby preventing gate 162 from moving.

In some examples, computing device 174 may also release lock 180. For example, computing device 174 may continue to monitor whether fall protection equipment in the set is connected to the support structure. In the event that one or more other articles of fall protection equipment are connected to the support structure, computing device 174 may release lock 180 such that lock 180 no longer impedes carrier sleeve 160 from being disconnected from the support structure. Additionally or alternatively, lock 180 may include a manual override that allows a user to manually release lock 180.

In the event that computing device 174 actuates lock 180, computing device 174 may generate a signal that indicates lock 180 has been actuated and/or that lock 180 has been manually overridden. In some examples, computing device 174 may generate an electronic message, an audible output, a visual output, and/or tactile output that indicates that lock 180 has been activated and/or a manual override has been performed.

It should be understood that the architecture and arrangement of carrier sleeve 160 illustrated in FIG. 5 is shown for exemplary purposes only. In other examples, carrier sleeve 160 may be configured in a variety of other ways having additional, fewer, or alternative components than those shown in FIG. 5. For example, as noted above, carrier sleeve 160 may be configured to include only a subset of components, such as first sensor 168, second sensor 172, and a communication unit for transmitting data to another computing device, such as one of hubs 14, for performing certain processing functions.

In another example, carrier sleeve 160 may include a feedback component for indicating a connection status of carrier sleeve 160. For example, the feedback component may comprise any variety of speakers, displays, lights, haptic feedback components, or the like to generate an audible alert, a visual alert, or a tactile alert in response to determining that carrier sleeve 160 is the only article of fall protection connected to a support structure.

In still another example, carrier sleeve 160 may include one or more components for determining whether a fall has occurred, such as fall sensor 182. For example, according to aspects of this disclosure, fall sensor 182 may comprise a switch, sensor, or the like for determining a fall condition. In one example, fall sensor 182 may determine deflection, movement, or motion of a component that attaches carrier sleeve 160 to a user in response to a load. If the load exceeds a predetermined threshold, fall sensor 182 (which may include hall-effect sensors, mechanical switches, or the like) may determine relative movement or a change in shape of the attachment component. In other examples, fall sensor 182 may be positioned anywhere on carrier sleeve 160 that allows fall sensor 182 to determine a change in load to a component that attaches carrier sleeve 160 to a user.

In addition to generating a signal in the event that an attachment component moves a predetermined amount in response to a given load, the position can also be monitored via sensors for a duration of time to indicate that a specific load has not only been applied to the connector but also applied for a duration. Based on such data, carrier sleeve 160 (or computing device 98) may determine that a user has fallen (thereby generating the load), but is also suspended post fall.

Based on data from fall sensor 182, carrier sleeve 160 (or another device, such as computing device 98) may generate one or more alerts. For example, upon determining that a fall has occurred, fall sensor 182 may generate an audible, visual, or wireless communication (e.g., electronic message) that indicates that the fall has occurred.

Figure 6:
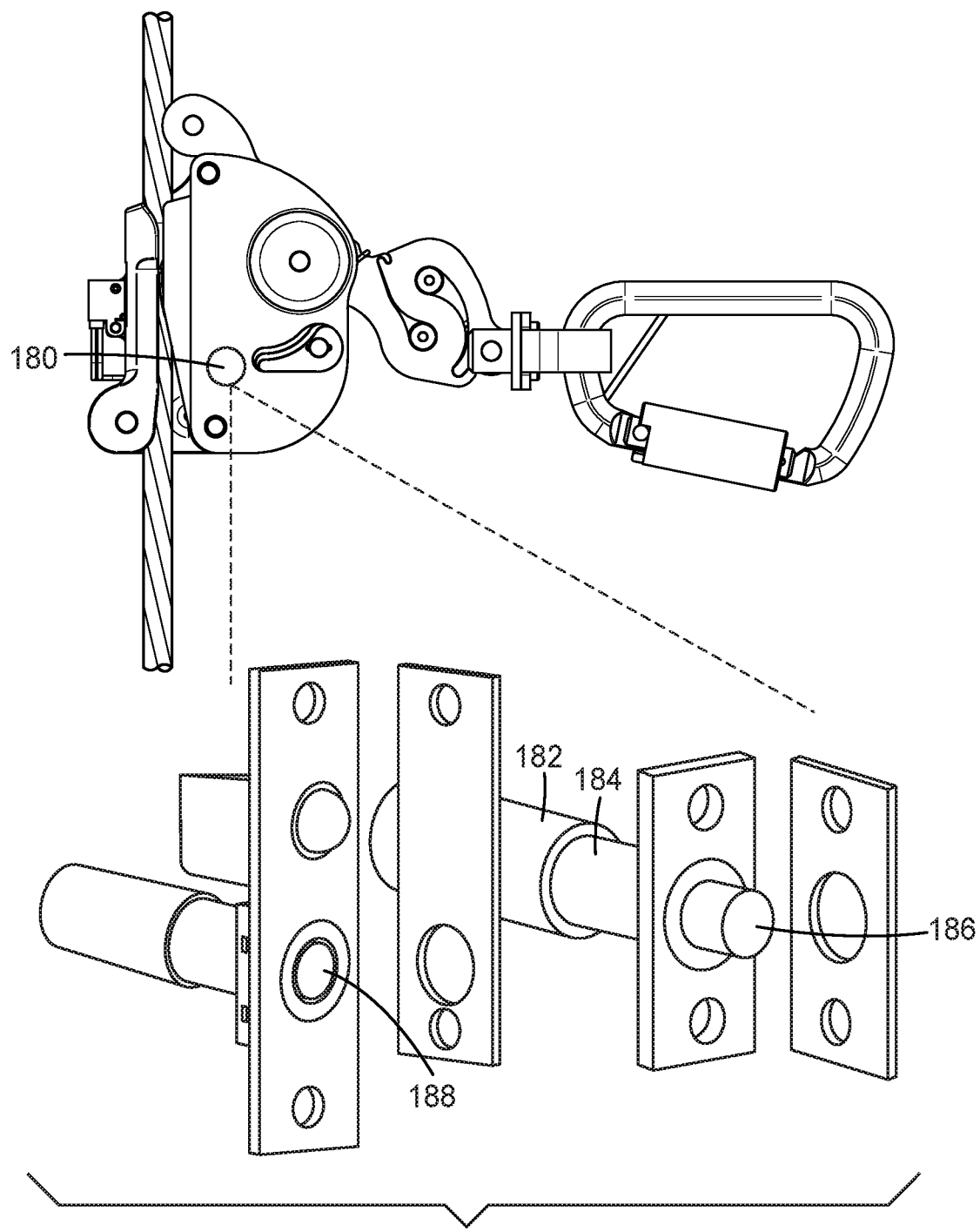
FIG. 6 illustrates another view of the ladder safety sleeve shown in FIG. 5.

FIG. 6 illustrates an example carrier sleeve 160 in greater detail. For example, as described above, lock 180 may be configured to impede or prevent gate 162 from being moved from a closed position to an open position based on a connection status of carrier sleeve 160, thereby impeding or preventing carrier sleeve 160 from being disconnected from a support structure. In the example of FIG. 6, lock 180 includes a solenoid 182 that moves a pin 184 from an extended position 186 to a retracted position 188 and vice versa.

For example, as described above with respect to FIG. 5, computing device 174 may determine when carrier sleeve 160 is the only article of fall protection equipment in the set that is connected to the support structure. Based on this determination, computing device 174 may activate lock 180. Upon activating lock 180, pin 184 may move from retracted position 188 to extended position 186. When in extended position 186, pin 184 may prevent gate 162 from moving from a closed position to an open position. In some examples, pin 184 may directly interface with gate 162 to prevent gate 162 from being opened. In other examples, pin 184 may interface with another component of carrier sleeve 160 (such as primary locking mechanism 176 or secondary locking mechanism 178) to prevent gate 162 from being opened.

In some examples, computing device 174 may also release lock 180. For example, computing device 174 may continue to monitor whether fall protection equipment in the set is connected to the support structure. In the event that one or more other articles of fall protection equipment are connected to the support structure, computing device 174 may release lock 180 by sending a signal to solenoid 182 to move pin 184 from extended position 186 to retracted position 188. Additionally or alternatively, lock 180 may include a manual override that allows a user to manually move pin 184 from extended position 186 to retracted position 188.

Figure 7:
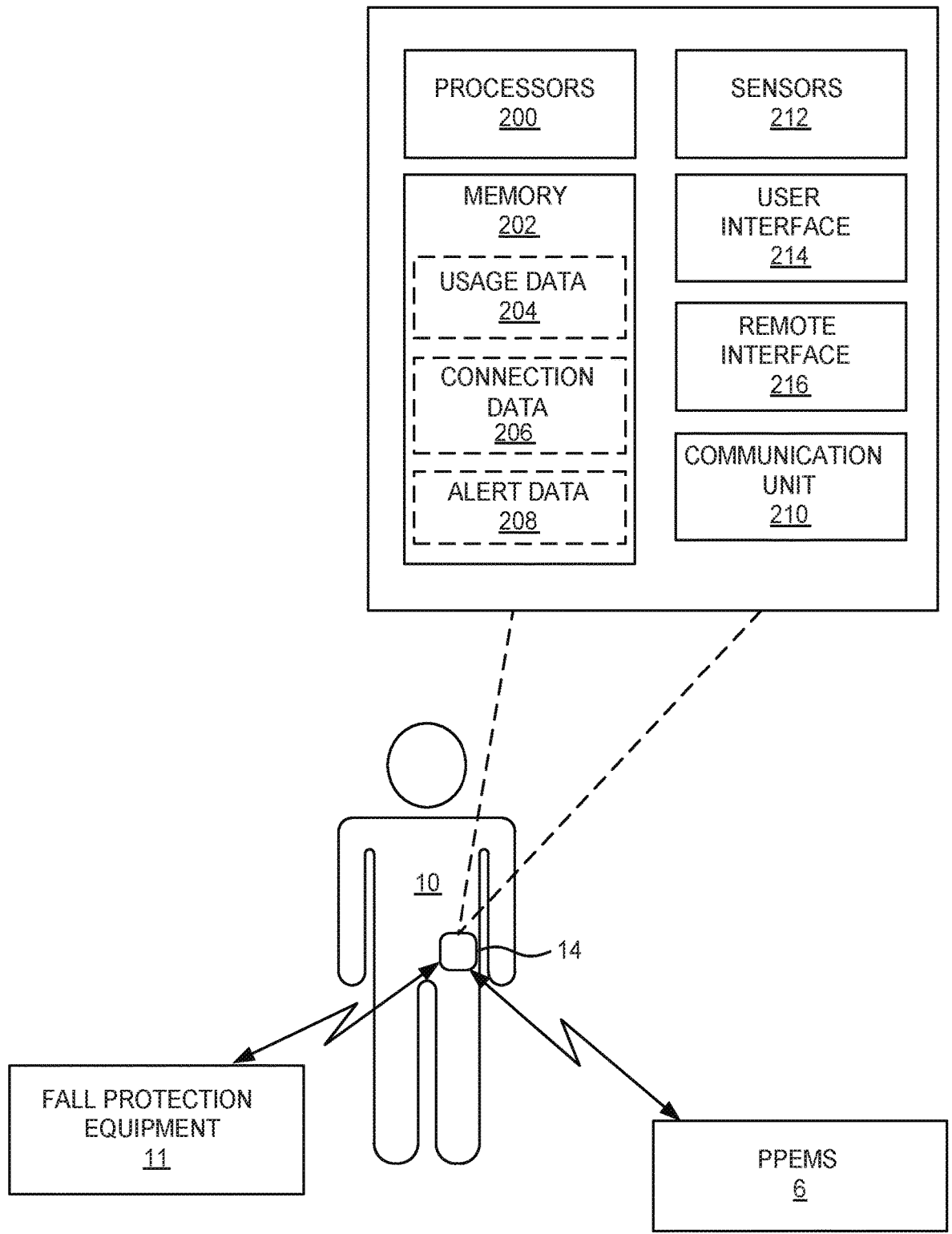
FIG. 7 is a conceptual diagram illustrating an example of fall protection equipment in communication with a wearable data hub, in accordance with various aspects of this disclosure.

FIG. 7 illustrates an example of one of hubs 14 in greater detail. For example, hub 14 includes one or more processors 200, memory 202 that may store usage data 204, connection data 206, and alert data 208, communication unit 210, sensors 212, user interface 214, and remote interface 216. It should be understood that the architecture and arrangement of hub 14 illustrated in FIG. 7 is shown for exemplary purposes only. In other examples, hub 14 may be configured in a variety of other ways having additional, fewer, or alternative components than those shown in FIG. 7. For example, hub 14 may also include one or more batteries, charging components, or the like not shown in FIG. 7. In addition, while shown as a wearable device in the example of FIG. 7, in other examples, hub 14 may be implemented as stand-alone device deployed in a particular environment.

In general, hub 14 may enable and facilitate communication between fall protection equipment 11 (e.g., such as snap hook 120 or carrier sleeve 160) and PPEMS 6. For example, fall protection equipment 11 as well as other PPEs for a respective worker may communicate with hub 14 via Bluetooth or other short range protocol, and hub 14 may communicate with PPEMs 6 via wireless communications, such as via 802.11 WiFi protocols, or the like. In some examples, as described in greater detail herein, hub 14 may also control one or more components of fall protection equipment 11 (e.g., such as locks) based on connection data 206, generate and/or output alerts, or perform a variety of other functions.

Processors 200, in one example, are configured to implement functionality and/or process instructions for execution within hub 14. For example, processors 200 may be capable of processing instructions stored by memory 202. Processors 200 may include, for example, microprocessors, digital signal processors (DSPs), application specific integrated circuits (ASICs), field-programmable gate array (FPGAs), or equivalent discrete or integrated logic circuitry.

Memory 202 may include a computer-readable storage medium or computer-readable storage device. In some examples, memory 202 may include one or more of a short-term memory or a long-term memory. Memory 202 may include, for example, random access memories (RAM), dynamic random access memories (DRAM), static random access memories (SRAM), magnetic hard discs, optical discs, flash memories, or forms of electrically programmable memories (EPROM) or electrically erasable and programmable memories (EEPROM).

In some examples, memory 202 may store an operating system (not shown) or other application that controls the operation of components of hub 14. For example, the operating system may facilitate the communication of data from memory 202 to communication unit 210. In some examples, memory 202 is used to store program instructions for execution by processors 200. Memory 202 may also be configured to store information within hub 14 during operation. In the example shown in FIG. 5, memory 202 may store usage data 204, connection data 206, and/or alert data 208, as described in greater detail below.

Hub 14 may use communication unit 210 to communicate with external devices via one or more wired or wireless connections. Communication unit 210 may include various mixers, filters, amplifiers and other components designed for signal modulation, as well as one or more antennas and/or other components designed for transmitting and receiving data. Communication unit 210 may send and receive data to other computing devices using any one or more suitable data communication techniques. Examples of such communication techniques may include TCP/IP, Ethernet, Wi-Fi, Bluetooth, 4G, LTE, to name only a few examples. For example, communication unit 210 may communicate with fall protection equipment 11 or other PPE via Bluetooth or other short range protocol, and communication unit 210 may communicate with PPEMs 6 via wireless communications, such as via 802.11 WiFi protocols, or the like.

Sensors 212 may include one or more sensors that generate data indicative of an activity of a worker 10 associated with hub 14 and/or data indicative of an environment in which hub 14 is located. Sensors 212 may include, as examples, one or more accelerometers, one or more to sensors to detect conditions present in a particular environment (e.g., sensors for measuring temperature, humidity, particulate content, noise levels, air quality, or any variety of other characteristics of environments in which fall protection equipment 11 may be used), or a variety of other sensors.

User interface 214 may include one more user interface devices including, as examples, a variety of lights, displays, haptic feedback generators, speakers or the like. In general, user interface 214 may output a status of fall protection equipment 11 and/or hub 14, as well as any alerts for worker 10. In one example, user interface 214 may include a plurality of multi-color LEDs that illuminate to provide information to worker 10. In another example, user interface 214 may include a motor that is configured to vibrate hub 14 to provide haptic feedback to worker 10.

Remote interface 216 is configured to generate data for output at clients 62 (FIG. 2). For example, remote interface 216 may generate data indicative of a status of fall protection equipment 11 and/or hub 14. For example, remote interface 216 may generate data that indicates whether fall protection equipment 11 is connected to hub 14 and/or information about components of fall protection equipment 11. That is, remote interface 216 may generate data indicative of, as examples, remaining service life of fall protection equipment 11, a status of a battery of fall protection equipment 11, a connection status of fall protection equipment 11, whether fall protection equipment 11 is the only fall protection equipment connected to a support structure, whether a user has performed a manual override of a lock of fall protection equipment, whether maintenance or replacement of fall protection equipment 11 is needed, or the like. Remote interface 216 may additionally or alternatively generate data that is indicative of any alerts issued by hub 14.

According to aspects of this disclosure, hub 14 may store usage data 204 from sensors of fall protection equipment 11. Usage data 204 generally refers to data that is indicative of the manner in which a user uses fall protection equipment 11 including, as examples, data that indicates a relative position of a component of fall protection equipment 11, data that is indicative of whether a support structure is disposed within an area of attachment of fall protection equipment 11, or other operations or characteristics of fall protection equipment 11.

As described herein, sensors of fall protection equipment 11 may generate data regarding operation of fall protection equipment 11 and transmit the data in real-time or near real-time to hub 14. In some examples, hub 14 may immediately relay usage data 204 to another computing device, such as PPEMS 6, via communication unit 210. In other examples, memory 202 may store usage data 204 for some time prior to uploading the data to another device. For example, in some instances, communication unit 210 may be able to communicate with fall protection equipment 11 but may not have network connectivity, e.g., due to an environment in which fall protection equipment 11 is located and/or network outages. In such instances, hub 14 may store usage data 204 to memory 202, which may allow the usage data to be uploaded to another device upon a network connection becoming available.

According to aspects of this disclosure, hub 14 also stores connection data 206 that indicates a connection status of one or more articles of fall protection equipment 11 used by worker 10. That is, connection data 206 may indicate whether respective articles of fall protection equipment 11 in a set of fall protection equipment being used by worker 10 are connected to a support structure. In some instances, hub 14 may receive connection data 206 from fall protection equipment 11, e.g., as determined by fall protection equipment 11. In other examples, hub 14 may receive data from sensors of fall protection equipment 11 and processors 200 may determine connection data 206 based on the received sensor data.

According to aspects of this disclosure, hub 14 may control the operation of fall protection equipment 11 based on connection data 206. For example, hub 14 may determine, based on connection data 206, that fall protection equipment 11 has been connected to a support structure. Hub 14 may also determine when one or more articles of fall protection equipment 11 have been disconnected from a support structure. Hub 14 may determine when a particular article of fall protection equipment 11 is the only article of fall protection equipment 11 in a set that is connected to a support structure. Based on this determination, in some examples, hub 14 may issue an audible, visual, or tactile alert (e.g., via user interface 214) or transmit an electronic message (e.g., via remote interface 216) that indicates that fall protection equipment 11 is the only article of fall protection equipment connected to the support structure. In other examples, hub 14 may activate a lock of fall protection equipment in order to impede or prevent fall protection equipment from being disconnected from the support structure.

According to aspects of this disclosure, hub 14 may store alert data 208 for generating alerts for output by user interface 214 and/or remote interface 216. For example, hub 14 may receive alert data from PPEMS 6, fall protection equipment 11, end-user computing devices 16, remote users using computing devices 18, safety stations 15, or other computing devices. In some examples, the alert data may be based on operation of fall protection equipment 11. For example, hub 14 may receive alert data 208 that indicates that fall protection equipment 11 is the only article of fall protection equipment connected to the support structure. As another example, hub 14 may receive alert data 208 that indicates operation of a lock and/or that a lock has been manually overridden. As still another example, hub 14 may receive alert data 208 that indicates that a fall has occurred.

Hub 14 may interpret the received alert data 208 and generate an output at user interface 214 (e.g., an audible, visual, or tactile output) or remote interface 216 to notify worker 10 or a remote party of the alert condition (e.g., an operation or override of a lock, that the environment is dangerous, that fall protection equipment 11 is malfunctioning, that one or more components of fall protection equipment 11 need to be repaired or replaced, or the like). In some instances, hub 14 may also interpret alert data 208 and issue one or more commands to fall protection equipment 11 to modify operation or enforce rules of fall protection equipment 11 in order to bring operation of fall protection equipment 11 into compliance with desired/less risky behavior.

In general, while certain techniques or functions are described herein as being performed by certain components, e.g., PPEMS 6, fall protection equipment 11, or hubs 14, it should be understood that the techniques of this disclosure are not limited in this way. That is, certain techniques described herein may be performed by one or more of the components of the described systems. For example, in some instances, fall protection equipment 11 may have a relatively limited sensor set and/or processing power. In such instances, one of hubs 14 and/or PPEMS 6 may responsible for most or all of the processing of usage data, determining connection status, and the like. In other examples, fall protection equipment 11 may have additional sensors, additional processing power, and/or additional memory, allowing for fall protection equipment 11 to perform additional techniques. Determinations regarding which components are responsible for performing techniques may be based, for example, on processing costs, financial costs, power consumption, or the like.

Figure 8:
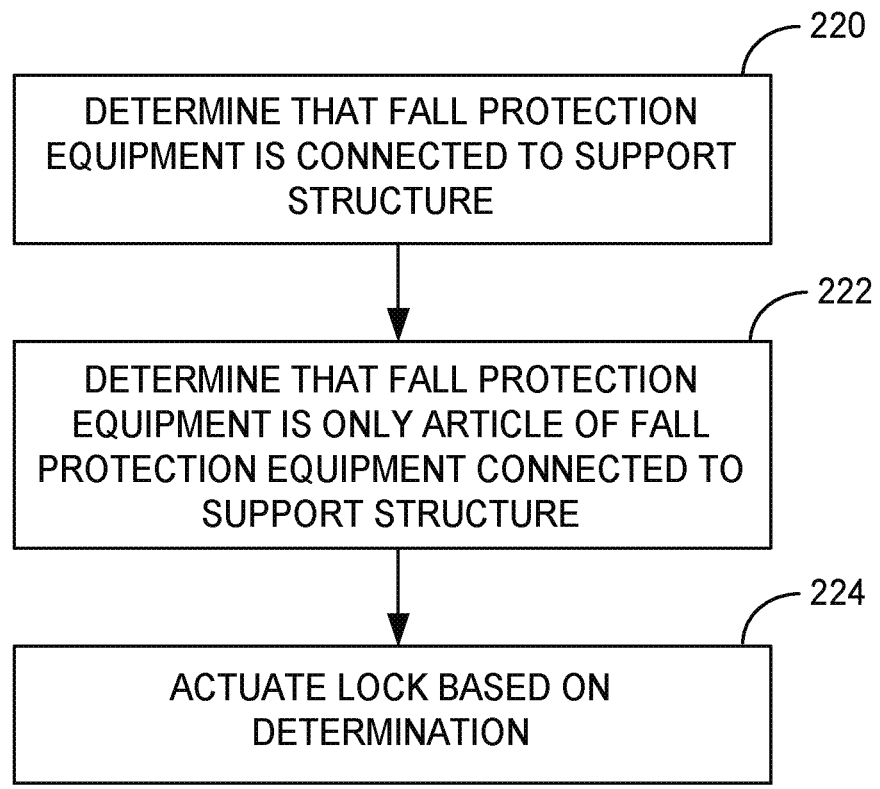
FIG. 8 is a flow diagram illustrating an example process for controlling the operation of an article of fall protection equipment, according to aspects of this disclosure.

FIG. 8 is a flow diagram illustrating an example process for controlling the operation of an article of fall protection equipment, according to aspects of this disclosure. While the techniques shown in FIG. 8 are described with respect to fall protection equipment 11, it should be understood that the techniques may be performed by a variety of computing devices, such as one of hubs 14, PPEMS 6, or another computing device.

In the illustrated example, fall protection equipment 11 may determine that fall protection equipment is connected to a support structure 11 (220). For example, fall protection equipment may receive data from one or more sensors incorporated in fall protection equipment 11 and determine a connection status based on the received data. In some instances, received data may indicate that a support structure is disposed within an area of attachment of fall protection equipment 11. In other instances, received data may indicate an operation of fall protection equipment 11, such as the opening or closing of a gate of fall protection equipment 11.

Fall protection equipment 11 may determine that fall protection equipment 11 is the only fall protection equipment connected to a support structure (222). For example, a worker may typically use multiple articles of fall protection equipment (referred to herein as a set of fall protection equipment) to allow the worker to maintain at least one connection to a support structure while the worker moves throughout a worksite. That is, the worker may maintain at least one connection to a support structure when the worker disconnects from one support structure and connects to another support structure. According to aspects of this disclosure, fall protection equipment 11 may determine that fall protection equipment 11 is the only fall protection equipment in the set connected to a support structure.

Based on the determination, fall protection equipment 11 may perform at least one operation. For example, according to aspects of this disclosure, fall protection equipment 11 may generate an alert that indicates that the first article of fall protection equipment is the only article of fall protection equipment that is connected to the at least one support structure. That is, in some examples, fall protection equipment 11 may generate an audible alert (e.g., via one or more speakers), a visual alert (e.g., via one or more displays, light emitting diodes (LEDs) or the like), or a tactile alert (e.g., via a component of fall protection equipment 11 that vibrates or provides other haptic feedback). In other examples, fall protection equipment 11 may generate an electronic message, e.g., for transmission to another device such as computing devices 18 (FIG. 1).

Additionally or alternatively, to perform the at least one operation, fall protection equipment 11 may actuate a lock in order to impede or prevent fall protection equipment 11 from being disconnected from the support structure (224). In some instances, the lock may be a tertiary lock mechanism that may be overridden by perform a particular action or set of actions.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over a computer-readable medium as one or more instructions or code, and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium.

It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry, as well as any combination of such components. Accordingly, the term "processor," as used herein may refer to any of the foregoing structures or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless communication device or wireless handset, a microprocessor, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

What is claimed is:

1. A fall-protection device comprising:
   a first article of fall protection equipment;
   a memory configured to store data that indicates whether the first article of fall protection equipment is connected to at least one support structure; and
   one or more processors configured to communicate with the memory and configured to:
     determine, based on the data, that the first article of fall protection equipment is connected to the at least one support structure, the first article of fall protection equipment being included in a set of fall protection equipment that comprises a second article of fall protection equipment;
     determine that the first article of fall protection equipment is the only article of fall protection equipment in the set of fall protection equipment that is connected to the at least one support structure; and
     perform, based on determining that the first article of fall protection equipment is the only article of fall protection equipment that is connected to the at least one support structure, at least one operation;
     wherein to perform the at least one operation, the one or more processors are configured to actuate, based on determining that the first article of fall protection equipment is the only article of fall protection equipment that is connected to the at least one support structure, a lock of the first article of fall protection equipment to impede the first article of fall protection equipment from being disconnected from the at least one support structure;
   wherein the first article of fall protection equipment comprises a carabiner or snap hook comprising:
     a body that at least partially defines an area of attachment for attachment of the body to the at least one support structure so that the first article of fall protection equipment is connected to the at least one support structure; and
     a moveable gate connected to the body and comprising a closed position that prevents access to the area of attachment, the movable gate being pivotally inwardly movable from the closed position toward the area of attachment into an open position that provides access to the area of attachment for connection of the first article of fall protection equipment to the at least one support structure;
     and wherein the lock of the first article of fall protection equipment is configured so that when the lock is actuated, the lock is in a locked condition in which the lock causes the movable gate of the first article of fall protection equipment to be unable to pivotally inwardly move from the closed position to the open position.

2. The device of claim 1, wherein to perform the at least one operation, the one or more processors are additionally configured to generate an alert that indicates that the first article of fall protection equipment is the only article of fall protection equipment that is connected to the at least one support structure.

3. The device of claim 2, wherein to generate the alert, the one or more processors are configured to generate, by the first article of fall protection equipment, an audible alert, a visual alert, and/or a tactile alert.

4. The device of claim 3, wherein to generate the alert, the one or more processors are configured to generate an electronic message that indicates that the first article of fall protection equipment is the only article of fall protection equipment that is connected to the at least one support structure.

5. The device of claim 2 wherein the lock of the first article of fall protection equipment is an electromechanically-actuated lock.

6. The device of claim 5 wherein the electromechanically-actuated lock comprises a solenoid.

7. The device of claim 5 wherein the electromechanically-actuated lock comprises a manual override that is configured to allow a user to manually release the electromechanically-actuated lock from the locked condition to an unlocked condition in which the lock allows the movable gate to pivotally inwardly move from the closed position to the open position.

8. The device of claim 1, wherein to determine that the first article of fall protection equipment is connected to the at least one support structure, the one or more processors are configured to:
   determine that the gate of the first article of fall protection equipment has opened;
   determine that the at least one support structure is disposed within the area of attachment of the first article of fall protection equipment; and
   determine that the gate of the first article of fall protection equipment has closed.

9. The device of claim 1, wherein to actuate the lock, the one or more processors are configured to generate a signal for actuating the lock and transmit the signal to the first article of fall protection equipment.

10. The device of claim 1, wherein the lock comprises a tertiary locking mechanism of the first article of fall protection equipment.

11. The device of claim 1, wherein the device comprises the second article of fall protection equipment and wherein the one or more processors are further configured to:

after actuating the lock of the first article of fall protection equipment, determine that the second article of fall protection equipment is connected to the at least one support structure; and based on determining that the first article of fall protection equipment and the at least one second article of fall protection equipment are connected to the at least one support structure, release the lock of the first article of fall protection equipment from the locked condition to an unlocked condition that allows the movable gate of the first article of fall protection equipment to pivotally inwardly move from the closed position to the open position.

12. The device of claim 11 wherein the device further comprises a safety harness that is configured to be worn by a human user and to which the first article of fall protection equipment and the second article of fall protection equipment are connected.

13. The device of claim 12 wherein the first article of fall protection equipment comprises a first lanyard and the second article of fall protection equipment comprises a second lanyard.

14. The device of claim 13 wherein the first and second lanyards are first and second self-retracting lanyards.

15. The device of claim 12 wherein the device is configured so that the human user of the device will maintain at least one connection to the at least one support structure throughout a time that the human user is working at an elevated height.

* * * * *